US011486739B2

(12) United States Patent
Ishikawara et al.

(10) Patent No.: US 11,486,739 B2
(45) Date of Patent: Nov. 1, 2022

(54) POSITION DETECTION DEVICE

(71) Applicant: TDK CORPORATION, Tokyo (JP)

(72) Inventors: Toshio Ishikawara, Tokyo (JP); Takahiro Moriya, Tokyo (JP); Toshihiko Oyama, Tokyo (JP)

(73) Assignee: TDK CORPORATION, Tokyo (JP)

( * ) Notice: Subject to any disclaimer, the term of this patent is extended or adjusted under 35 U.S.C. 154(b) by 68 days.

(21) Appl. No.: 17/078,193

(22) Filed: Oct. 23, 2020

(65) Prior Publication Data
US 2021/0140800 A1 May 13, 2021

(30) Foreign Application Priority Data
Nov. 8, 2019 (JP) .............................. JP2019-203573

(51) Int. Cl.
*G01D 5/244* (2006.01)
(52) U.S. Cl.
CPC ................ *G01D 5/24428* (2013.01)
(58) Field of Classification Search
None
See application file for complete search history.

(56) References Cited

U.S. PATENT DOCUMENTS

2015/0050013 A1\* 2/2015 Cadugan ................. G01B 7/14
702/150

FOREIGN PATENT DOCUMENTS

JP        2006-250580 A        9/2006

\* cited by examiner

*Primary Examiner* — Jas A Sanghera
(74) *Attorney, Agent, or Firm* — Oliff PLC

(57) ABSTRACT

A position detection device includes a magnetic scale and a magnetic sensor. The magnetic scale includes a plurality of magnets arranged along a first reference direction. The magnetic sensor includes a plurality of detectors that detect a composite magnetic field. The plurality of detectors are each arranged to satisfy AG=N(M−W)/(n−1), where n is the number of magnets of the magnetic scale, M is a distance from a first end to a second end, W is the width of each of the plurality of magnets and is greater than 0 and less than or equal to M/n, AG is a gap between each of the plurality of magnets and each of the plurality of detectors in a second reference direction, and N is a number greater than or equal to 0.4 and less than or equal to 2.

21 Claims, 18 Drawing Sheets

POSITION DETECTION DEVICE

BACKGROUND OF THE INVENTION

1. Field of the Invention

The present invention relates to a magnetic position detection device including a magnetic scale and a magnetic sensor.

2. Description of the Related Art

A magnetic position detection device including a magnetic scale and a magnetic sensor is used, for example, to detect the position of a movable object that changes its position in a linear direction. The position detection device used to detect the position of a movable object is configured so that the relative position of the magnetic scale to the magnetic sensor changes within a predetermined range to follow a change in the position of the movable object.

For example, the magnetic scale includes a plurality of magnets arranged along the linear direction. As the relative position of the magnetic scale to the magnetic sensor changes, the direction of a target magnetic field that is generated by the magnetic scale and applied to the magnetic sensor rotates. For example, the magnetic sensor detects components of the target magnetic field in two respective different directions, and generates two detection signals corresponding to the strengths of the components in the two directions. On the basis of the two detection signals, the magnetic sensor then generates a detection value having a correspondence with the relative position of the magnetic scale to the magnetic sensor.

In some cases, a noise magnetic field other than the target magnetic field can be applied to the magnetic sensor of the magnetic position detection device in addition to the target magnetic field. Examples of the noise magnetic field include the Earth magnetic field and a leak magnetic field from a motor. If a noise magnetic field is applied to the magnetic sensor, the magnetic sensor detects a composite magnetic field of the target magnetic field and the noise magnetic field. As a result, an error occurs in the detection value when the target magnetic field and the noise magnetic field have different directions.

JP 2006-250580 A describes a magnetic detection device including two Hall elements that are arranged on the rotation axis of a detection magnet, and a differential output circuit that provides a differential output of detection signals from the two Hall elements. The magnetic detection device cancels offset voltages resulting from a disturbance magnetic field by determining a difference between two Hall voltages, and outputs a voltage having substantially the same output waveform as when no disturbance magnetic field is applied.

To reduce the error in the detection value due to the noise magnetic field, the position detection device including the magnetic scale can be configured so that a plurality of detectors for detecting the target magnetic field are arranged along the moving direction of the magnetic scale. In such a configuration, for example, a first detector is located at a first position, and a second detector at a second position. The first detector generates a first detection signal having a correspondence with the strength of a component of the target magnetic field in a first direction at the first position, and a second detection signal having a correspondence with the strength of a component of the target magnetic field in a second direction at the first position. The second detector generates a third detection signal having a correspondence with the strength of a component of the target magnetic field in the first direction at the second position, and a fourth detection signal having a correspondence with the strength of a component of the target magnetic field in the second direction at the second position.

In the foregoing configuration, the magnetic sensor generates two processed signals by performing arithmetic processing for determining a difference between the first and third detection signals and arithmetic processing for determining a difference between the second and fourth detection signals. The magnetic sensor then generates a detection value having a correspondence with the relative position of the magnetic scale to the magnetic sensor on the basis of the two processed signals.

Like the magnetic detection device described in JP 2006-250580 A, determining a difference between the two detection signals can reduce an error in the detection value due to the noise magnetic field, whereby the detection value can be expected to approach an ideal value. In reality, however, the detection value generated by using the two processed signals can differ greatly from the ideal value, and there have been cases where the error in the detection value cannot be sufficiently reduced.

SUMMARY OF THE INVENTION

An object of the present invention is to provide a position detection device including a plurality of detectors for detecting a target magnetic field, wherein an error in a detection value can be sufficiently reduced while reducing an error due to a noise magnetic field.

A position detection device according to a first aspect of the present invention includes a magnetic scale that generates an external magnetic field, and a magnetic sensor that detects a target magnetic field and a noise magnetic field other than the target magnetic field, the target magnetic field being a part of the external magnetic field. The magnetic scale is configured so that a relative position of the magnetic scale to the magnetic sensor is changeable along a first reference direction, and includes a plurality of magnets that are arranged along the first reference direction. The plurality of magnets each have a predetermined width that is a dimension in the first reference direction. A foremost one of the plurality of magnets in a first direction that is a direction parallel to the first reference direction has a first end located on a front side of the magnet in the first direction. A foremost one of the plurality of magnets in a second direction opposite to the first direction has a second end located on a front side of the magnet in the second direction. The magnetic sensor includes a plurality of detectors that each detect a composite magnetic field of the target magnetic field and the noise magnetic field at a position away from the magnetic scale.

In the position detection device according to the first aspect of the present invention, the plurality of detectors are each arranged to satisfy:

$$AG=N(M-W)/(n-1),$$

where n is the number of the plurality of magnets, M is a distance from the first end to the second end, W is the width of each of the plurality of magnets and is greater than 0 and less than or equal to M/n, AG is a gap between each of the plurality of magnets and each of the plurality of detectors in a second reference direction orthogonal to the first reference direction, and N is a number greater than or equal to 0.4 and less than or equal to 2.

In the position detection device according to the first aspect of the present invention, N may be a number greater than or equal to 0.5 and less than or equal to 2.

In the position detection device according to the first aspect of the present invention, the magnetic scale may further include a yoke that is made of a magnetic material and magnetically connects the plurality of magnets.

A position detection device according to a second aspect of the present invention includes a magnetic scale that generates an external magnetic field, and a magnetic sensor that detects a target magnetic field and a noise magnetic field other than the target magnetic field, the target magnetic field being a part of the external magnetic field. The magnetic scale is configured so that a relative position of the magnetic scale to the magnetic sensor is changeable along a first reference direction, and includes a magnet magnetized in a direction parallel to a second reference direction orthogonal to the first reference direction. The magnet has a first end and a second end located on opposite sides in the first reference direction. The magnetic sensor includes a plurality of detectors that each detect a composite magnetic field of the target magnetic field and the noise magnetic field at a position away from the magnetic scale.

In the position detection device according to the second aspect of the present invention, the plurality of detectors are each arranged to satisfy:

$$0.175M \leq AG \leq 2M,$$

where M is a distance from the first end to the second end, and AG is a gap between the magnet and each of the plurality of detectors in the second reference direction.

A position detection device according to a third aspect of the present invention includes a magnetic scale that generates an external magnetic field, and a magnetic sensor that detects a target magnetic field and a noise magnetic field other than the target magnetic field, the target magnetic field being a part of the external magnetic field. The magnetic scale is configured so that a relative position of the magnetic scale to the magnetic sensor is changeable along a first reference direction, and includes a magnet magnetized in a direction parallel to the first reference direction. The magnet has a first end and a second end located on opposite sides in the first reference direction. The magnetic sensor includes a plurality of detectors that each detect a composite magnetic field of the target magnetic field and the noise magnetic field at a position away from the magnetic scale.

In the position detection device according to the third aspect of the present invention, the plurality of detectors are each arranged to satisfy:

$$0.425M \leq AG \leq 2M,$$

where M is a distance from the first end to the second end, and AG is a gap between the magnet and each of the plurality of detectors in a second reference direction orthogonal to the first reference direction.

In the position detection devices according to the first to third aspects of the present invention, the plurality of detectors may be arranged in a row along the first reference direction.

In the position detection devices according to the first to third aspects of the present invention, the plurality of detectors may each include either or both of at least one first magnetic detection element that detects a component of the composite magnetic field in a third direction and at least one second magnetic detection element that detects a component of the composite magnetic field in a fourth direction different from the third direction. The magnetic sensor may further include a processor.

The plurality of detectors may each include either or both of a first detection circuit that includes the at least one first magnetic detection element and generates a first detection signal indicating strength of the component of the composite magnetic field in the third direction and a second detection circuit that includes the at least one second magnetic detection element and generates a second detection signal indicating strength of the component of the composite magnetic field in the fourth direction. The processor may generate one or two processed signals by arithmetic processing for determining either or both of a difference between at least two of a plurality of first detection signals generated by the first detection circuits of the plurality of detectors and a difference between at least two of a plurality of second detection signals generated by the second detection circuits of the plurality of detectors, and generate a detection value having a correspondence with the relative position by using the one or two processed signals.

Alternatively, the plurality of detectors may each include the at least one first magnetic detection element, the at least one second magnetic detection element, a first detection circuit that includes the at least one first magnetic detection element and generates a first detection signal indicating strength of the component of the composite magnetic field in the third direction, and a second detection circuit that includes the at least one second magnetic detection element and generates a second detection signal indicating strength of the component of the composite magnetic field in the fourth direction. The processor may generate a first processed signal by arithmetic processing including determination of a difference between at least two of a plurality of first detection signals generated by the first detection circuits of the plurality of detectors, generate a second processed signal by arithmetic processing including determination of a difference between at least two of a plurality of second detection signals generated by the second detection circuits of the plurality of detectors, and generate a detection value having a correspondence with the relative position by using the first and second processed signals.

In the position detection devices according to the first to third aspects of the present invention, the at least one first magnetic detection element may be at least one first magnetoresistive element, and the at least one second magnetic detection element may be at least one second magnetoresistive element. Alternatively, the at least one first magnetic detection element may be at least one first Hall element, and the at least one second magnetic detection element may be at least one second Hall element.

The position detection devices according to the first to third aspects of the present invention include the plurality of detectors that detect the target magnetic field. In the present invention, the plurality of detectors are each arranged to satisfy at least a requirement defined by AG and M. According to the present invention, an error in the detection value can thus be sufficiently reduced while reducing an error due to the noise magnetic field.

Other and further objects, features and advantages of the present invention will appear more fully from the following description.

DETAILED DESCRIPTION OF THE PREFERRED EMBODIMENTS

First Embodiment

Figure 1:
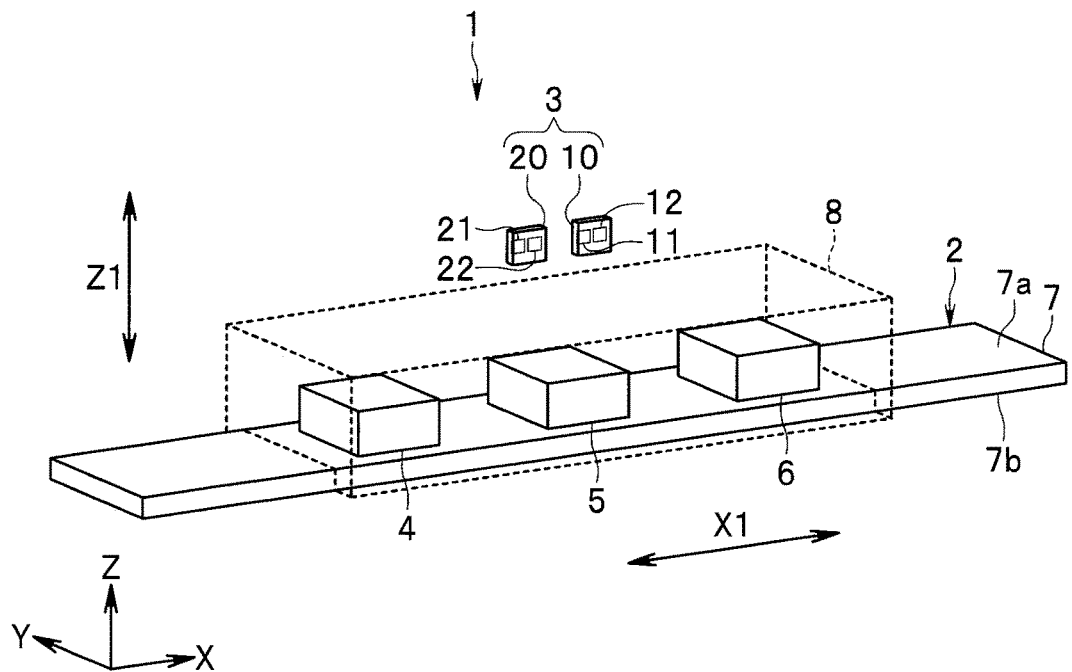
FIG. 1 is a perspective view showing a schematic configuration of a position detection device according to a first embodiment of the invention.

Preferred embodiments of the present invention will now be described in detail with reference to the drawings. A schematic configuration of a position detection device according to a first embodiment of the present invention will initially be described with reference to FIGS. 1 and 2. A position detection device 1 according to the present embodiment includes a magnetic scale 2 and a magnetic sensor 3. The magnetic scale 2 generates an external magnetic field MF having a spatial distribution of strength and direction. In the present embodiment, a part of the external magnetic field MF for the magnetic sensor 3 to detect will be referred to as a target magnetic field. The magnetic sensor 3 detects the target magnetic field and a noise magnetic field Mex other than the target magnetic field.

A relative position of the magnetic scale 2 to the magnetic sensor 3 can change within a predetermined range along a first reference direction X1. The first reference direction X1 is a linear direction. The magnetic scale 2 is a linear scale and includes a plurality of magnets arranged along the first reference direction X1. In particular, in the present embodiment, the magnetic scale 2 includes three magnets 4, 5, and 6 of the identical shape as the plurality of magnets. The external magnetic field MF is a combination of the magnetic fields generated by the respective three magnets 4, 5, and 6.

The magnets 4, 5, and 6 are arranged in this order in one direction. The magnets 4, 5, and 6 are arranged at distances from each other. The distance between the magnets 4 and 5 and the distance between the magnets 5 and 6 are equal to each other. The magnets 4, 5, and 6 each have a predetermined width W that is a dimension in the first reference direction X1. The magnets 4, 5, and 6 have the same width W.

The magnetic scale 2 further includes a yoke 7 made of a magnetic material such as NiFe. The yoke 7 is used as a substrate that magnetically connects and supports the magnets 4, 5, and 6. The yoke 7 has a plate shape long in one direction. The yoke 7 has a top surface 7a and a bottom surface 7b. The magnets 4, 5, and 6 are arranged on the top surface 7a of the yoke 7. The magnetic sensor 3 is opposed to the top surface 7a of the yoke 7.

Figure 2:
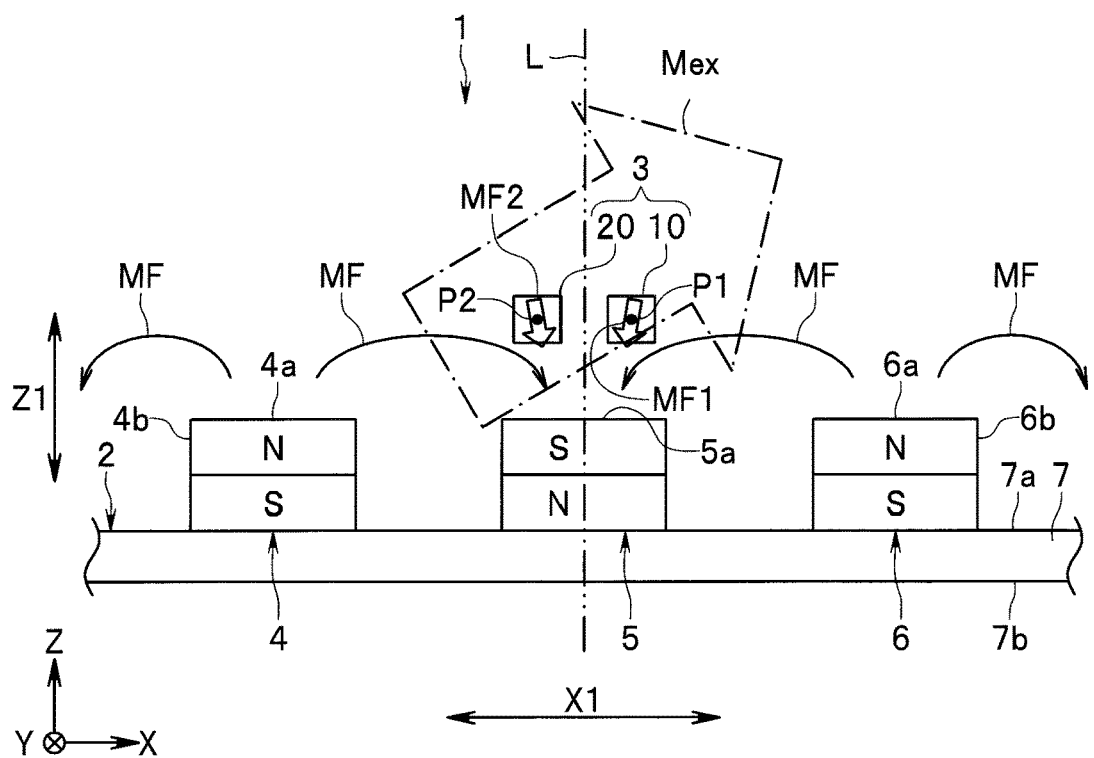
FIG. 2 is a front view showing a schematic configuration of the position detection device according to the first embodiment of the invention.

The magnetic scale 2 further includes a protection unit 8 that is made of a non-magnetic material such as a resin, and covers the magnets 4, 5, and 6, and a part of the yoke 7. In FIG. 2, the protection unit 8 is omitted.

Now, we define X, Y, and Z directions as shown in FIGS. 1 and 2. In the present embodiment, a direction parallel to the first reference direction X1 is referred to as the X direction. Two mutually-orthogonal directions perpendicular to the X direction are referred to as the Y and Z directions. In FIG. 2, the Y direction is shown as a direction from the near side to the far side of FIG. 2. The opposite directions to the X, Y, and Z directions will be referred to as −X, −Y, and −Z directions, respectively. The −X direction corresponds to the first direction according to the present invention. The X direction corresponds to the second direction according to the present invention.

The three magnets 4, 5, and 6 are arranged in this order in the X direction. The magnet 4 is located foremost in the −X direction among the magnets 4, 5, and 6. The magnet 6 is located foremost in the X direction among the magnets 4, 5, and 6.

The magnet 4 has a top surface 4a farthest from the top surface 7a of the yoke 7. The magnet 5 has a top surface 5a farthest from the top surface 7a of the yoke 7. The magnet 6 has a top surface 6a farthest from the top surface 7a of the yoke 7.

The magnet 4 further has a first end 4b located on the front side of the magnet 4 in the −X direction. The first end 4b is one of two ends of the magnet 4 located on opposite sides in the first reference direction X1, and is located at a position farther from the magnet 6. The magnet 6 further has a second end 6b located on the front side of the magnet 6 in the X direction. The second end 6b is one of two ends of the magnet 6 located on opposite sides in the first reference direction X1, and is located at a position farther from the magnet 4.

The three magnets 4, 5, and 6 have an N pole and an S pole each. The N and S poles of the magnets 4 and 6 are arranged in this order in the −Z direction. The N and S poles of the magnet 5 are arranged in this order in the Z direction.

The yoke 7 is situated so that a direction perpendicular to the top surface 7a and leading from the bottom surface 7b to the top surface 7a coincides with the Z direction. The yoke 7 magnetically connects the S pole-side end of the magnet 4, the N pole-side end of the magnet 5, and the S pole-side end of the magnet 6. The yoke 7 has a function of controlling a flow of magnetic flux so that a magnetic flux occurring from the N pole-side end of the magnet 5 flows effectively into the S pole-side end of the magnet 4 and that of the magnet 6.

As described above, the relative position of the magnetic scale 2 to the magnetic sensor 3 can change within a predetermined range along the first reference direction X1. The relative position of the magnetic scale 2 to the magnetic sensor 3 will hereinafter be referred to simply as a relative position. In the present embodiment, either one of the magnetic scale 2 and the magnetic sensor 3 moves linearly in the X or −X direction with a not-shown movable object. This changes the relative position in the X or −X direction. The direction of the target magnetic field at a given position rotates about the given position with the change in the relative position.

The position detection device 1 is a device for detecting the relative position. The magnetic sensor 3 generates a detection value having a correspondence with the relative position. In particular, in the present embodiment, the magnetic sensor 3 generates, as the detection value, a value θs having a correspondence with a reference angle that the direction of the target magnetic field at a predetermined reference position forms with respect to a predetermined direction within a reference plane. The detection value may hereinafter be referred to as a detection value θs. The detection value θs has a correspondence with the relative position.

In the present embodiment, the range of the detection value θs may be a range where the relative position can be uniquely identified. Such a range of the detection value θs is where the detection value θs does not have the same value at a plurality of relative positions. An example is a range narrower than 0° to 360°. To limit the range of the detection value θs to a range narrower than 0° to 360°, the predetermined range where the relative position can change (hereinafter, referred to as a movable range) may be set to a range corresponding to detection values θs of 0° to 360° while the range where magnetic sensor 3 actually generates the detection value θs is limited to a range narrower than 0° to 360°. The range of relative positions corresponding to the limited range of the detection value θs may be used as the detectable range of relative positions. Alternatively, the movable range may be set to a range narrower than the range where the detection value θs takes the values of 0° to 360°. In such a manner, the relative position can be uniquely identified by the detection value θs.

Now, a direction that is orthogonal to the first reference direction X1 and parallel to the Z and −Z directions will be referred to as a second reference direction Z1. The magnetic sensor 3 includes a plurality of detectors that each detect a composite magnetic field of the target magnetic field and the noise magnetic field Mex at a position away from the magnetic scale 2. In the present embodiment, the plurality of detectors are each arranged at a position away from the magnetic scale 2 in the second reference direction Z1. The plurality of detectors each include either or both of at least one first magnetic detection element that detects a component of the composite magnetic field in a third direction D3 and at least one second magnetic detection element that detects a component of the composite magnetic field in a fourth direction D4 different from the third direction D3. In the present embodiment, each of the plurality of detectors includes both the magnetic detection elements. In other words, each of the plurality of detectors includes at least one first magnetic detection element and at least one second magnetic detection element. The third and fourth directions D3 and D4 may be orthogonal or not orthogonal to each other. In the present embodiment, the X direction is the third direction D3, and the Z direction is the fourth direction D4.

In the present embodiment, the magnetic sensor 3 includes a first detector 10 and a second detector 20 as the plurality of detectors. When seen in the Y direction, the first and second detectors 10 and 20 are arranged in a row along the first reference direction X1. The first and second detectors 10 and 20 may have the same or different positions in the Y direction. In the present embodiment, the first and second detectors 10 and 20 are located on the same plane that intersects the magnetic scale 2 and is parallel to the XZ plane. The first and second detectors 10 and 20 may be arranged in the same housing or separate housings.

The first detector 10 detects a first composite magnetic field MF1 that is the composite magnetic field of the target magnetic field and the noise magnetic field Mex at a first detection position P1. The second detector 20 detects a second composite magnetic field MF2 that is the composite magnetic field of the target magnetic field and the noise magnetic field Mex at a second detection position P2. In the present embodiment, the first detector 10 is arranged at the first detection position P1. Similarly, the second detector 20 is arranged at the second detection position P2.

Figure 10:
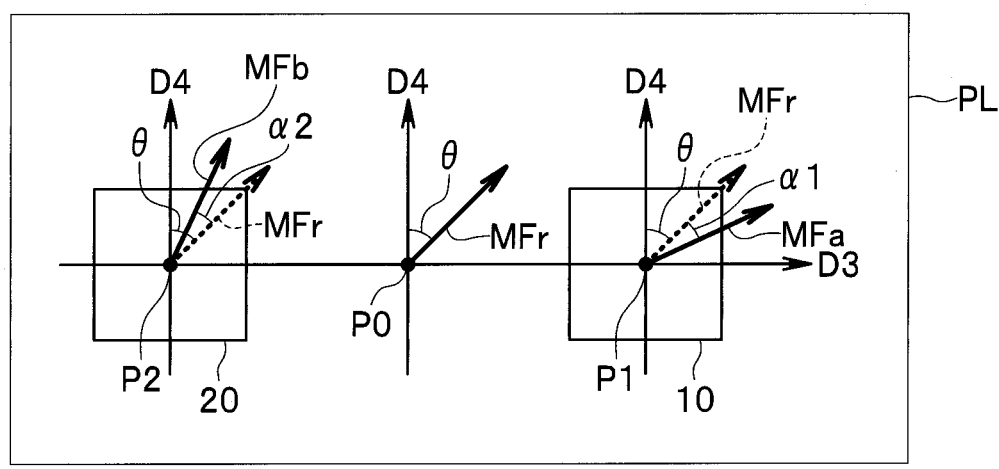
FIG. 10 is an explanatory diagram showing a target magnetic field to be detected by the first detector and a second detector of the first embodiment of the present invention.

The target magnetic field for the first detector 10 to detect, i.e., the target magnetic field at the first detection position P1 will be referred to as a first partial magnetic field and denoted by the symbol MFa. The target magnetic field for the second detector 20 to detect, i.e., the target magnetic field at the second detection position P2 will be referred to as a second partial magnetic field and denoted by the symbol MFb. The first and second partial magnetic fields MFa and MFb are shown in FIG. 10 to be described later. The first composite magnetic field MF1 is a composite magnetic field of the first partial magnetic field MFa and the noise magnetic field Mex. The second composite magnetic field MF2 is a composite magnetic field of the second partial magnetic field MFb and the noise magnetic field Mex.

The direction and the strength of the noise magnetic field Mex at the second detection position P2 are respectively equal to the direction and the strength of the noise magnetic field at the first detection position P1. The noise magnetic field Mex may be a magnetic field whose direction and strength are temporally constant, a magnetic field whose direction and strength temporally vary in a periodic manner, or a magnetic field whose direction and strength temporally vary in a random fashion.

Figure 3:
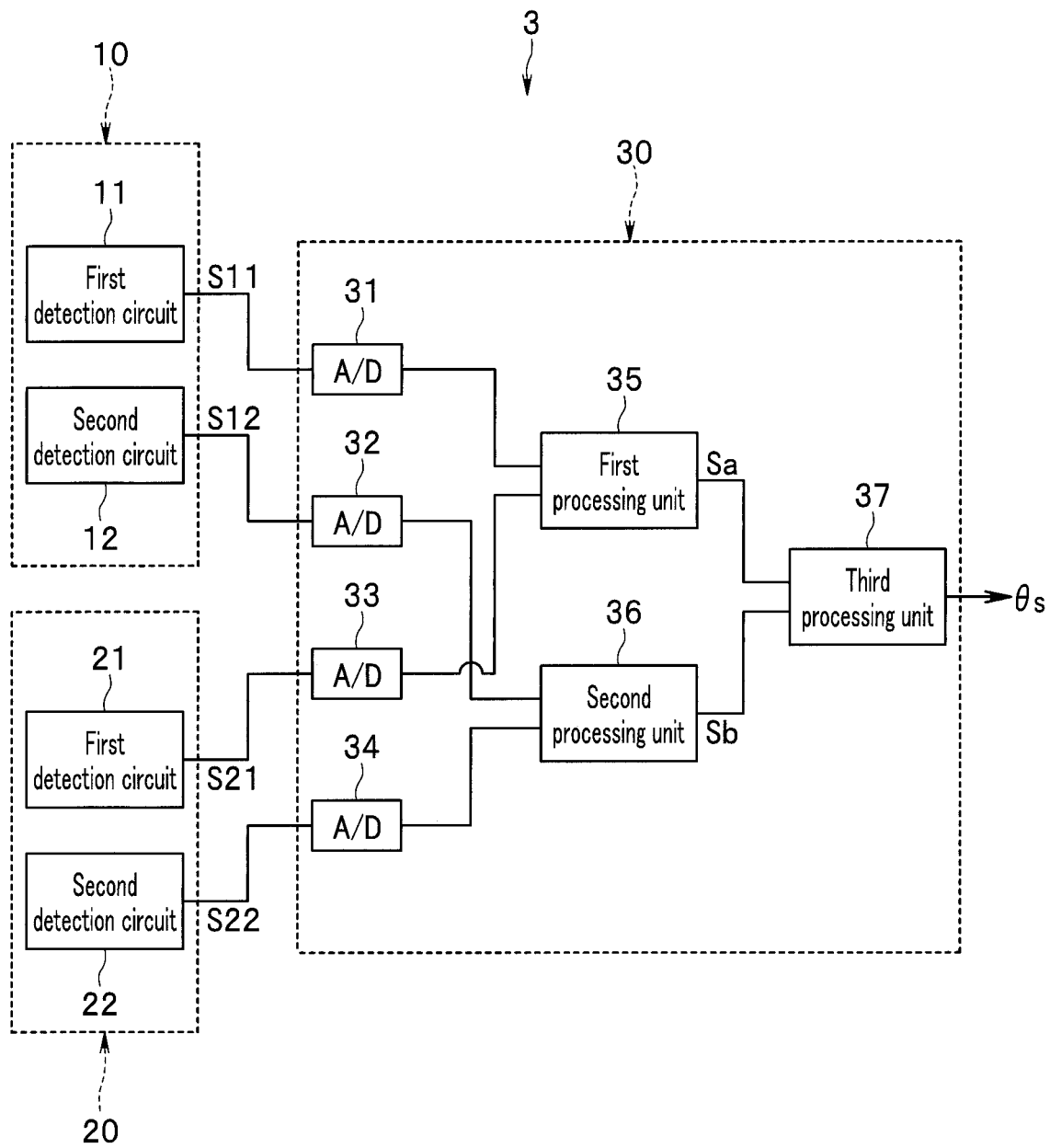
FIG. 3 is a block diagram showing the configuration of a magnetic sensor of the first embodiment of the invention.

Next, reference is made to FIG. 3 to describe the configuration of the magnetic sensor 3 in detail. FIG. 3 is a block diagram showing the configuration of the magnetic sensor 3. As described above, the magnetic sensor 3 includes the first and second detectors 10 and 20. The first and second detectors 10 and 20 each include a first detection circuit including the at least one first magnetic detection element and a second detection circuit including the at least one second magnetic detection element. The first detection circuit generates a first detection signal having a correspondence with the strength of the component of the composite magnetic field in the third direction D3 (X direction). The second detection circuit generates a second detection signal having a correspondence with the strength of the component of the composite magnetic field in the fourth direction D4 (Z direction). The first detection circuit of the first detector 10 will hereinafter be denoted by the reference numeral 11, and the second detection circuit of the first detector 10 will be denoted by the reference numeral 12. The first detection circuit of the second detector 20 will be denoted by the reference numeral 21, and the second detection circuit of the second detector 20 will be denoted by the reference numeral 22.

The first detection circuit 11 of the first detector 10 generates a first detection signal S11 indicating the strength of the first composite magnetic field MF1 in the third direction D3. The second detection circuit 12 of the first detector 10 generates a second detection signal S12 indicating the strength of the first composite magnetic field MF1 in the fourth direction D4. The main component of the first composite magnetic field MF1 is the first partial magnetic field MFa. The first detection signal S11 thus has a correspondence with the strength of the component of the first partial magnetic field MFa in the third direction D3. The second detection signal S12 has a correspondence with the strength of the component of the first partial magnetic field MFa in the fourth direction D4.

The first detection circuit 21 of the second detector 20 generates a first detection signal S21 indicating the strength of the second composite magnetic field MF2 in the third direction D3. The second detection circuit 22 of the second detector 20 generates a second detection signal S22 indicating the strength of the second composite magnetic field MF2 in the fourth direction D4. The main component of the second composite magnetic field MF2 is the second partial magnetic field MFb. The first detection signal S21 thus has a correspondence with the strength of the component of the second partial magnetic field MFb in the third direction D3. The second detection signal S22 has a correspondence with the strength of the component of the second partial magnetic field MFb in the fourth direction D4.

The magnetic sensor 3 further includes a processor 30. The processor 30 can be implemented by an application-specific integrated circuit (ASIC) or a microcomputer, for example. If the first and second detectors 10 and 20 are located in the same housing, the entire processor 30 may be located in the same housing as the first and second detectors 10 and 20 are. At least a part of the processor 30 may be located at a position physically separated from the housing including the first and second detectors 10 and 20. If the first detector 10 is located in a first housing and the second detector 20 is located in a second housing different from the first housing, the processor 30 may be located at least in part in either or both of the first and second housings. At least a part of the processor 30 may be located at a position physically separated from the first and second housings.

The processor 30 includes analog-to-digital converters (hereinafter, □A/D converters □) 31, 32, 33 and 34. The A/D converters 31 converts the first detection signal S11 into digital signal. The A/D converters 32 converts the second detection signal S12 into digital signal. The A/D converters 33 converts the first detection signal S21 into digital signal. The A/D converters 34 converts the second detection signal S22 into digital signal.

The magnetic sensor 3 further includes a first processing unit 35, a second processing unit 36, and a third processing unit 37. The first to third processing units 35 to 37 may be functional blocks or physically separate circuits.

The first processing unit 35 generates a first processed signal Sa by arithmetic processing for determining a difference between the two first detection signals S11 and S21 generated by the two first detection circuits 11 and 21. In particular, in the present embodiment, the first processing unit 35 generates the first processed signal Sa corresponding to a difference S21−S11 between the first detection signal S11 digitally converted by the A/D converter 31 and the first detection signal S21 digitally converted by the A/D converter 33. The first processed signal Sa may be the difference S21−S11 itself, or a signal obtained by making a predetermined correction such as gain adjustment and offset adjustment to the difference S21−S11.

The second processing unit 36 generates a second processed signal Sb by arithmetic processing for determining a difference between the two second detection signals S12 and S22 generated by the two second detection circuits 12 and 22. In particular, in the present embodiment, the second processing unit 36 generates the second processed signal Sb corresponding to a difference S22−S12 between the second detection signal S12 digitally converted by the A/D converter 32 and the second detection signal S22 digitally converted by the A/D converter 34. The second processed signal Sb may be the difference S22−S12 itself, or a signal obtained by making a predetermined correction such as gain adjustment and offset adjustment to the difference S22−S12.

The third processing unit 37 generates the detection value θs by using the first and second processed signals Sa and Sb. Specifically, for example, the third processing unit 37 calculates θs by calculating the arctangent of the ratio of Sa to Sb. The third processing unit 37 may assume an angle (hereinafter, referred to as an angle estimation value) itself obtained by calculating the arctangent of the ratio of Sa to Sb as the detection value θs. Alternatively, the third processing unit 37 may assume a value obtained by making a predetermined correction such as phase adjustment to the angle estimation value as the detection value θs.

Now, assume a first vector V1 representing the direction and strength of the first composite magnetic field MF1 and a second vector V2 representing the direction and strength of the second composite magnetic field MF2. Assume also a composite vector of a vector −V1 and the second vector V2, i.e., V2−V1. The vector −V1 is one having the same magnitude as that of the first vector V1 and a direction opposite to that of the first vector V1. If the first processed signal Sa is the difference S21−S11 itself, the first processed signal Sa has a correspondence with the magnitude of a component of the composite vector V2−V1 in the third direction D3 (X direction). If the second processed signal Sb is the difference S22−S12 itself, the second processed signal Sb has a correspondence with the magnitude of a component of the composite vector V2−V1 in the fourth direction D4 (Z direction). Since the angle estimation value is obtained by calculating the arctangent of the ratio of Sa to Sb, the angle estimation value has a correspondence with the direction of the composite vector V2−V1. The directions of the vectors V1, V2, and V2−V1 and the foregoing reference angle also change as the relative position changes. The angle estimation value thus has a correspondence with the reference angle, as well as with the relative position. For such a reason, the detection value θs has a correspondence with the reference angle, as well as with the relative position.

Next, first to third examples of the magnetic sensor 3 will be described. The first example of the magnetic sensor 3 will initially be described. In the first example, the first and second detectors 10 and 20 each include at least one first magnetoresistive element as the at least one first magnetic detection element, and at least one second magnetoresistive element as the at least one second magnetic detection element. Magnetoresistive elements will hereinafter be referred to as MR elements.

Figure 4:
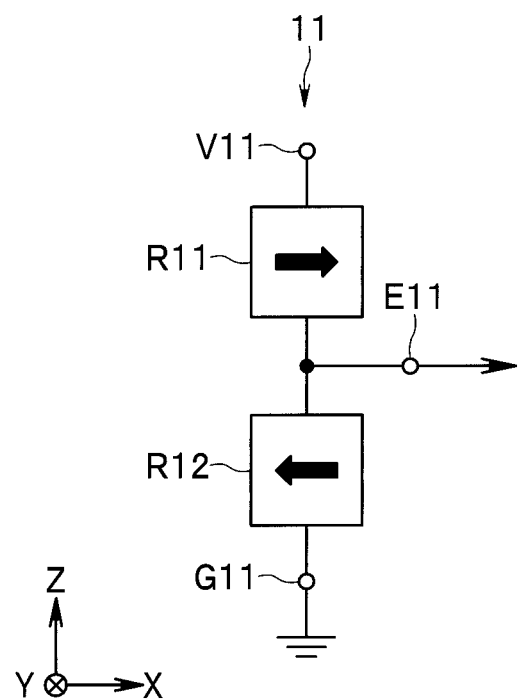
FIG. 4 is a circuit diagram showing an example of a configuration of a first detection circuit in a first example of the magnetic sensor of the first embodiment of the present invention.

FIG. 4 shows a specific example of configuration of the first detection circuit 11 in the first detector 10 according to the first example. In this example, the first detection circuit 11 of the first detector 10 includes two first MR elements R11 and R12, a power supply port V11, a ground port G11, and an output port E11. One end of the first MR element R11 is connected to the power supply port V11. The other end of the first MR element R11 is connected to one end of the first MR element R12 and the output port E11. The other end of the MR element R12 is connected to the ground port G11. A power supply voltage of predetermined magnitude is applied to the power supply port V11. The ground port G11 is connected to the ground. The output port E11 outputs a signal corresponding to the potential of the connection point between the first MR elements R11 and R12.

In the first example, the first detection circuit 21 of the second detector 20 has the same configuration as that of the first detection circuit 11 of the first detector 10. Thus, in the following description, components of the first detection circuit 21 are denoted by the same reference signs as those used for the components of the first detection circuit 11.

Figure 5:
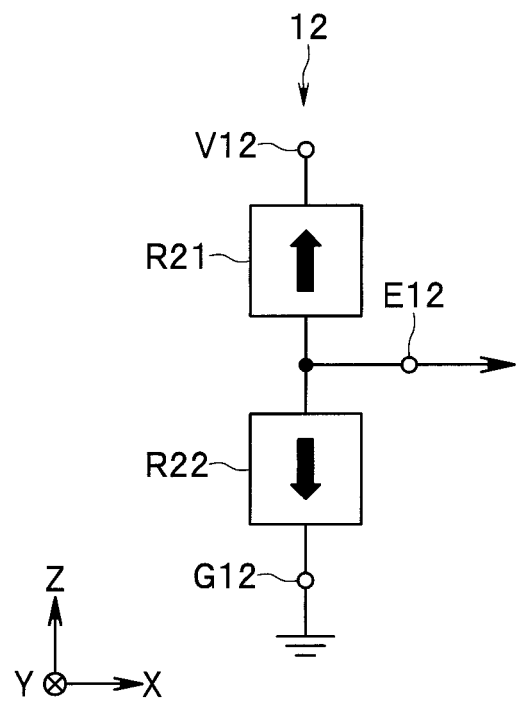
FIG. 5 is a circuit diagram showing an example of a configuration of a second detection circuit in a first example of the magnetic sensor of the first embodiment of the present invention.

FIG. 5 shows a specific example of configuration of the second detection circuit 12 in the first detector 10 according to the first example. In this example, the second detection circuit 12 of the first detector 10 includes two second MR elements R21 and R22, a power supply port V12, a ground port G12, and an output port E12. One end of the second MR element R21 is connected to the power supply port V12. The other end of the second MR element R21 is connected to one end of the first MR element R22 and the output port E12. The other end of the second MR element R22 is connected to the ground port G12. A power supply voltage of predetermined magnitude is applied to the power supply port V12. The ground port G12 is connected to the ground. The output port E12 outputs a signal corresponding to the potential of the connection point between the second MR elements R21 and R22.

In the first example, the second detection circuit 22 of the second detector 20 has the same configuration as that of the second detection circuit 12 of the first detector 10. Thus, in the following description, components of the second detection circuit 22 are denoted by the same reference signs as those used for the components of the second detection circuit 12.

The MR element is a spin-valve MR element, for example. The spin-valve MR element includes a magnetization pinned layer whose magnetization direction is pinned, a free layer which is a magnetic layer whose magnetization direction changes with the direction of the target magnetic field, and a nonmagnetic layer located between the magnetization pinned layer and the free layer. The spin-valve MR element may be a TMR element or a GMR element. In the TMR element, the nonmagnetic layer is a tunnel barrier layer. In the GMR element, the nonmagnetic layer is a nonmagnetic conductive layer. The resistance of the spin-valve MR element changes with the angle that the magnetization direction of the free layer forms with respect to the magnetization direction of the magnetization pinned layer. The resistance of the spin-valve MR element is at its minimum value when the foregoing angle is 0°, and at its maximum value when the foregoing angle is 180°. In FIGS. 4 and 5, the arrows shown in the MR elements R11, R12, R21, and R22 indicate the magnetization directions of the respective magnetization pinned layers included in the MR elements R11, R12, R21, and R22.

In the first detection circuit 11 of the first detector 10, the magnetization direction of the magnetization pinned layer of the first MR element R11 is the third direction D3 (X direction). The magnetization direction of the magnetization pinned layer of the first MR element R12 is opposite to the third direction D3. In such a case, the potential of the connection point between the first MR elements R11 and R12 changes with the strength of the component of the first composite magnetic field MF1 in the third direction D3. The first detection circuit 11 thus detects the component of the first composite magnetic field MF1 in the third direction D3, and outputs a signal indicating the strength of the component as the first detection signal S11.

In the second detection circuit 12 of the first detector 10, the magnetization direction of the magnetization pinned layer of the second MR element R21 is the fourth direction D4 (Z direction). The magnetization direction of the magnetization pinned layer of the second MR element R22 is opposite to the fourth direction D4. In such a case, the potential of the connection point between the second MR elements R21 and R22 changes with the strength of the component of the first composite magnetic field MF1 in the fourth direction D4. The second detection circuit 12 thus detects the component of the first composite magnetic field MF1 in the fourth direction D4, and outputs a signal indicating the strength of the component as the second detection signal S12.

In the first detection circuit 21 of the second detector 20, the magnetization direction of the magnetization pinned layer of the first MR element R11 is the third direction D3 (X direction). The magnetization direction of the magnetization pinned layer of the first MR element R12 is opposite to the third direction D3. In such a case, the potential of the connection point between the first MR elements R11 and R12 changes with the strength of the component of the second composite magnetic field MF2 in the third direction D3. The first detection circuit 21 thus detects the component of the second composite magnetic field MF2 in the third direction D3, and outputs a signal indicating the strength of the component as the first detection signal S21.

In the second detection circuit 22 of the second detector 20, the magnetization direction of the magnetization pinned layer of the second MR element R21 is the fourth direction D4 (Z direction). The magnetization direction of the magnetization pinned layer of the second MR element R22 is opposite to the fourth direction D4. In such a case, the potential of the connection point between the second MR elements R21 and R22 changes with the strength of the component of the second composite magnetic field MF2 in the fourth direction D4. The second detection circuit 22 thus detects the component of the second composite magnetic field MF2 in the fourth direction D4, and outputs a signal indicating the strength of the component as the second detection signal S22.

In the light of the production accuracy of the MR elements and other factors, the magnetization directions of the magnetization pinned layers of the plurality of MR elements in the detection circuits 11, 12, 21 and 22 may be slightly different from the above-described directions.

Requirements for the detection signals S11, S12, S21, and S22 to indicate the strength of the component of the target magnetic field in one direction as described above include the following: that the resistances of the MR elements will not be saturated within the range of strength of the first and second composite magnetic fields MF1 and MF2; and that the relationship between a change in the strength of the component of the target magnetic field in the one direction and a change in the resistances of the MR elements satisfy a linear relationship. To satisfy the foregoing requirements, a type of MR elements that detect the strength of a component of a magnetic field in one direction may be used as the MR elements R11, R12, R21, and R22. MR elements of such type are configured, for example, by forming the MR elements in an almost rectangular planar shape so that the magnetization directions of the free layers of the MR elements change at substantially constant speed as the strength of the component of the magnetic field in the one direction changes.

Figure 6:
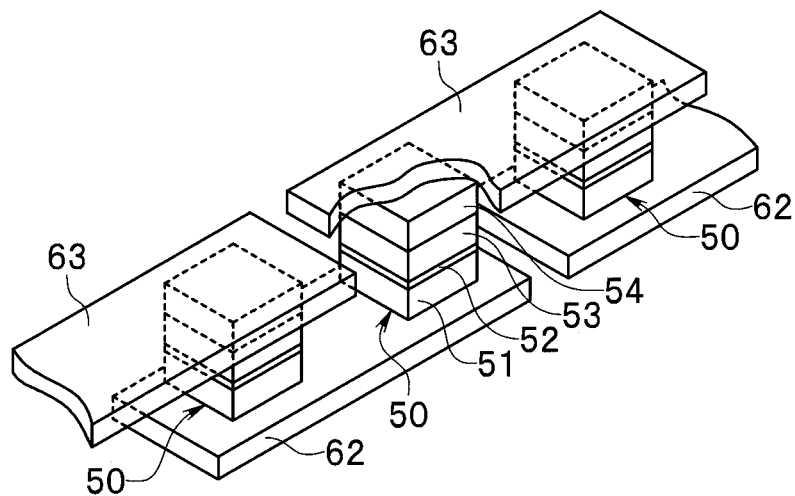
FIG. 6 is a perspective view of a portion of a magnetoresistive element shown in FIG. 4 and FIG. 5.

An example of the configuration of the MR elements will now be described with reference to FIG. 6. FIG. 6 is a perspective view showing a part of one MR element in the first and second detection circuits 11 and 12 shown in FIGS. 4 and 5. In this example, the MR element includes a plurality of lower electrodes 62, a plurality of MR films 50 and a plurality of upper electrodes 63. The plurality of lower electrodes 62 are arranged on a substrate, not shown. Each of the lower electrodes 62 has a long slender shape. Every two lower electrodes 62 that are adjacent to each other in the longitudinal direction of the lower electrodes 62 have a gap therebetween. As shown in FIG. 6, MR films 50 are provided on the top surfaces of the lower electrodes 62, near opposite ends in the longitudinal direction. Each of the MR films 50 includes a free layer 51, a nonmagnetic layer 52, a magnetization pinned layer 53, and an antiferromagnetic layer 54 which are stacked in this order, the free layer 51 being closest to the lower electrode 62. The free layer 51 is electrically connected to the lower electrode 62. The antiferromagnetic layer 54 is formed of an antiferromagnetic material. The antiferromagnetic layer 54 is in exchange coupling with the magnetization pinned layer 53 so as to pin the magnetization direction of the magnetization pinned layer 53. The plurality of upper electrodes 63 are arranged over the plurality of MR films 50. Each of the upper electrodes 63 has a long slender shape, and establishes electrical connection between the respective antiferromagnetic layers 54 of two adjacent MR films 50 that are arranged on two lower electrodes 62 adjacent in the longitudinal direction of the lower electrodes 62. With such a configuration, the plurality of MR films 50 in the MR element shown in FIG. 6 are connected in series by the plurality of lower electrodes 62 and the plurality of upper electrodes 63. It should be appreciated that the layers 51 to 54 of the MR films 50 may be stacked in an order reverse to that shown in FIG. 6.

Next, the second example of the magnetic sensor 3 will be described. In the second example, the first and second detectors 10 and 20 each include at least one first Hall element as the at least one first magnetic detection element, and at least one second Hall element as the at least one second magnetic detection element. In particular, in the second example, both the first and second Hall elements are situated so that the strength of a component of the composite magnetic field in a direction parallel to the Y direction is detected.

Figure 7:
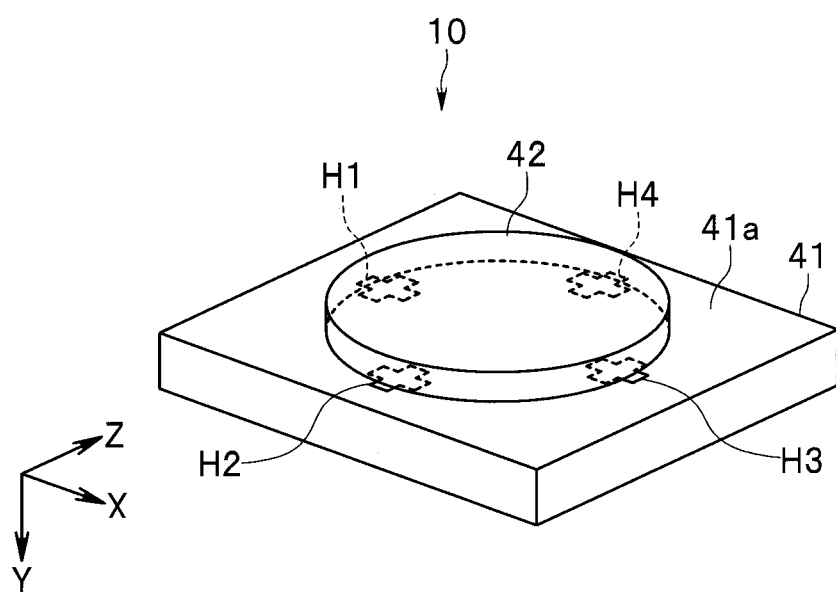
FIG. 7 is a perspective view showing essential parts of a first detector in a second example of the magnetic sensor of the first embodiment of the present invention.

FIG. 7 is a perspective view showing essential parts of the first detector 10 according to the second example. In the second example, the first detection circuit 11 includes two first Hall elements H1 and H3. The second detection circuit 12 includes two Hall elements H2 and H4. The first detector 10 further includes a substrate 41 that is made of a nonmagnetic material and has a top surface 41a, and a yoke 42 that is made of a magnetic material. The top surface 41a is parallel to the XZ plane.

The Hall elements H1 to H4 are embedded in the substrate 41 near the top surface 41a in an orientation such that their magnetic sensing surfaces are parallel to the top surface 41a. The first Hall elements H1 and H3 are arranged in a row in the X direction. The second Hall elements H2 and H4 are arranged in a row in the Z direction.

The yoke 42 has a disk shape. The yoke 42 is located on the top surface 41a of the substrate 41 to overlap a part of each of the Hall elements H1 to H4. The first Hall element H1 is located near the end of the yoke 42 in the −X direction. The second Hall element H2 is located near the end of the yoke 42 in the −Z direction. The first Hall element H3 is located near the end of the yoke 42 in the X direction. The second Hall element H4 is located near the end of the yoke 42 in the Z direction.

Figure 8:
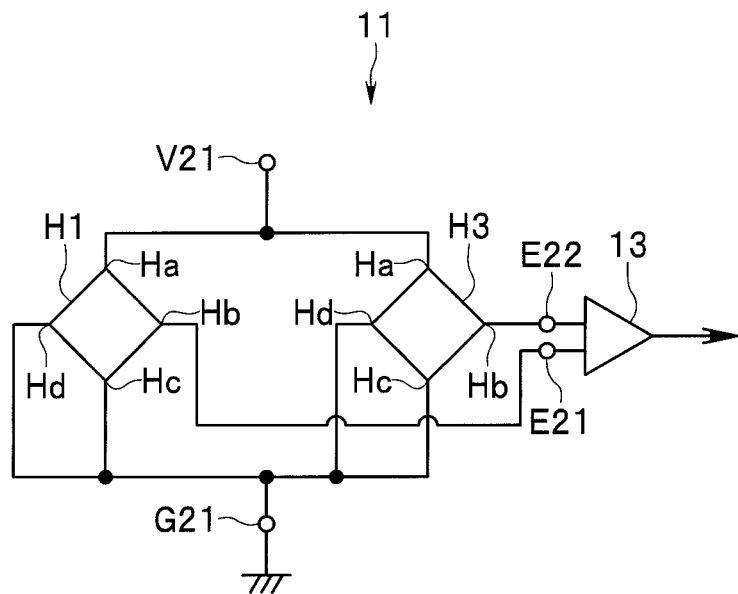
FIG. 8 is a circuit diagram showing an example of a configuration of a first detection circuit in a second example of the magnetic sensor of the first embodiment of the present invention.
Figure 9:
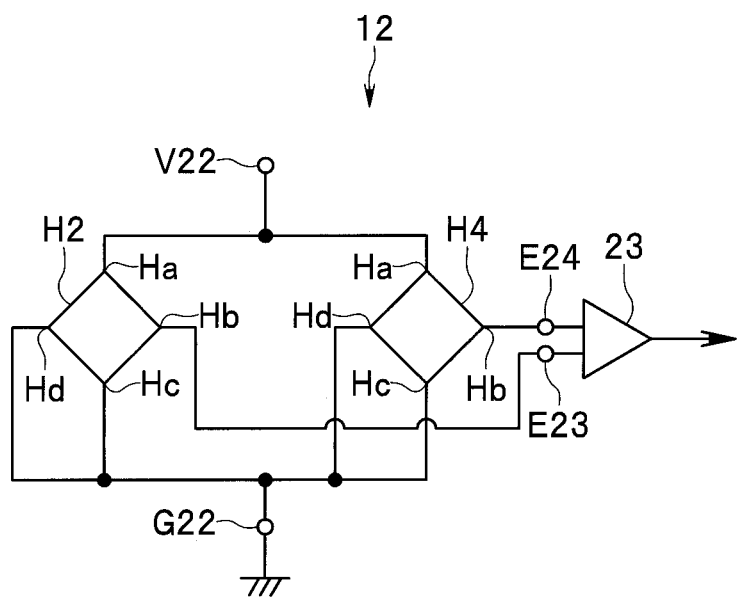
FIG. 9 is a circuit diagram showing an example of a configuration of a second detection circuit in a second example of the magnetic sensor of the first embodiment of the present invention.

FIG. 8 shows a specific example of configuration of the first detection circuit 11 according to the second example. FIG. 9 shows a specific example of configuration of the second detection circuit 12 according to the second example. As shown in FIG. 8, the first detection circuit 11 further includes a power supply port V21, a ground port G21, two output ports E21 and E22, and a differential detector 13. As shown in FIG. 9, the second detection circuit 12 further includes a power supply port V22, a ground port G22, two output ports E23 and E24, and a differential detector 23. As shown in FIGS. 8 and 9, the Hall elements H1 to H4 each include a power supply terminal Ha, a ground terminal Hc, and two output terminals Hb and Hd.

In the first detection circuit 11, the power supply terminals Ha of the first Hall elements H1 and H3 are connected to the power supply port V21. The ground terminals Hc of the first Hall elements H1 and H3 and the output terminals Hd of the first Hall elements H1 and H3 are connected to the ground port G21. The output terminal Hb of the first Hall element H1 is connected to the output port E21. The output terminal Hb of the first Hall element H3 is connected to the output port E22. A power supply voltage of predetermined magnitude is applied to the power supply port V21. The ground port G21 is connected to the ground.

In the second detection circuit 12, the power supply terminals Ha of the second Hall elements H2 and H4 are connected to the power supply port V22. The ground terminals Hc of the second Hall elements H2 and H4 and the output terminals Hd of the second Hall elements H2 and H4 are connected to the ground port G22. The output terminal Hb of the second Hall element H2 is connected to the output port E23. The output terminal Hb of the second Hall element H4 is connected to the output port E24. A power supply voltage of predetermined magnitude is applied to the power supply port V22. The ground port G22 is connected to the ground.

In the first detector 10, the yoke 42 receives the first composite magnetic field MF1 and generates an output magnetic field. The output magnetic field includes an output magnetic field component in a direction parallel to the Y direction. The output magnetic field component changes with the first composite magnetic field MF1. Specifically, if the yoke 42 receives the component of the first composite magnetic field MF1 in the X direction, the yoke 42 generates an output magnetic field component in the −Y direction near the first Hall element H1 and generates an output magnetic field component in the Y direction near the first Hall element H3. If the yoke 42 receives the component of the first composite magnetic field MF1 in the −X direction, the directions of the output magnetic field components are opposite to when the yoke 42 receives the component of the first composite magnetic field MF1 in the X direction.

In the first detection circuit 11, the first Hall elements H1 and H3 detect the component of the first composite magnetic field MF1 in the X or −X direction by detecting the output magnetic field components in the Y and −Y directions generated near the first Hall elements H1 and H3. A potential difference between the output ports E21 and E22 changes with the strength of the component of the first composite magnetic field MF1 in the X direction, i.e., the third direction D3. The differential detector 13 outputs a signal corresponding to the potential difference between the output ports E21 and E22, i.e., a signal indicating the strength of the component of the first composite magnetic field MF1 in the third direction D3 (X direction) as the first detection signal S11.

In the first detector 10, if the yoke 42 receives the component of the first composite magnetic field MF1 in the Z direction, the yoke 42 generates an output magnetic field component in the −Y direction near the second Hall element H2 and generates an output magnetic field component in the Y direction near the second Hall element H4. If the yoke 42 receives the component of the first composite magnetic field MF1 in the −Z direction, the directions of the output magnetic field components are opposite to when the yoke 42 receives the component of the first composite magnetic field MF1 in the Z direction.

In the second detection circuit 12, the second Hall elements H2 and H4 detect the component of the first composite magnetic field MF1 in the Z or −Z direction by detecting the output magnetic field components in the Y and −Y directions generated near the second Hall elements H2 and H4. A potential difference between the output ports E23 and E24 changes with the strength of the component of the first composite magnetic field MF1 in the Z direction, i.e., the fourth direction D4. The differential detector 23 outputs a signal corresponding to the potential difference between the output ports E23 and E24, i.e., a signal indicating the strength of the component of the first composite magnetic field MF1 in the fourth direction D4 (Z direction) as the second detection signal S12.

The second detector 20 and the first and second detection circuits 21 and 22 according to the second example have the same configuration as that of the first detector 10 and the first and second detection circuits 11 and 12 shown in FIGS. 7 to 9. In the following description, the components of the second detector 20 and the first and second detection circuits 21 and 22 will thus be denoted by the same reference numerals and symbols as those used for the first detector 10 and the first and second detection circuits 11 and 12.

In the second detector 20, the yoke 42 receives the second composite magnetic field MF2 and generates an output magnetic field. The output magnetic field includes an output magnetic field component in a direction parallel to the Y direction. The output magnetic field component changes with the second composite magnetic field MF2. Specifically, if the yoke 42 receives the component of the second composite magnetic field MF2 in the X direction, the yoke 42 generates an output magnetic field component in the −Y direction near the first Hall element H1 and generates an output magnetic field component in the Y direction near the first Hall element H3. If the yoke 42 receives the component of the second composite magnetic field MF2 in the −X direction, the directions of the output magnetic field components are opposite to when the yoke 42 receives the component of the second composite magnetic field MF2 in the X direction.

In the first detection circuit 21, the first Hall elements H1 and H3 detect the component of the second composite magnetic field MF2 in the X or −X direction by detecting the output magnetic field components in the Y and −Y directions generated near the first Hall elements H1 and H3. A potential difference between the output ports E21 and E22 changes with the strength of the component of the second composite magnetic field MF2 in the X direction, i.e., the third direction D3. The differential detector 13 outputs a signal corresponding to the potential difference between the output ports E21 and E22, i.e., a signal indicating the strength of the component of the second composite magnetic field MF2 in the third direction D3 (X direction) as the first detection signal S21.

In the second detector 20, if the yoke 42 receives the component of the second composite magnetic field MF2 in the Z direction, the yoke 42 generates an output magnetic field component in the −Y direction near the second Hall element H2 and generates an output magnetic field component in the Y direction near the second Hall element H4. If the yoke 42 receives the component of the second composite magnetic field MF2 in the −Z direction, the directions of the output magnetic field components are opposite to when the yoke 42 receives the component of the second composite magnetic field MF2 in the Z direction.

In the second detection circuit 22, the second Hall elements H2 and H4 detect the component of the second composite magnetic field MF2 in the Z or −Z direction by detecting the output magnetic field components in the Y and −Y directions generated near the second Hall elements H2 and H4. A potential difference between the output ports E23 and E24 changes with the strength of the component of the second composite magnetic field MF2 in the Z direction, i.e., the fourth direction D4. The differential detector 23 outputs a signal corresponding to the potential difference between the output ports E23 and E24, i.e., a signal indicating the strength of the component of the second composite magnetic field MF2 in the fourth direction D4 (Z direction) as the second detection signal S22.

Next, the third example of the magnetic sensor 3 will be described. In the third example, like the second example, the first and second detectors 10 and 20 each include at least one first Hall element as the at least one first magnetic detection element, and at least one second Hall element as the at least one second magnetic detection element.

In particular, in the third example, the first Hall element is situated so that the strength of the component of the composite magnetic field in a direction parallel to the third direction D3 (X direction) is detected. Specifically, the first Hall element is situated so that its magnetic sensing surface is parallel to the YZ plane. The second Hall element is situated so that the strength of the component of the composite magnetic field in a direction parallel to the fourth direction D4 (Z direction) is detected. Specifically, the second Hall element is situated so that its magnetic sensing surface is parallel to the XY plane. In the third example, the first and second detectors 10 and 20 do not include the yoke 42 shown in FIG. 6.

In the third example, the first detection circuit 11 of the first detector 10 and the first detection circuit 21 of the second detector 20 include the first Hall elements. The second detection circuit 12 of the first detector 10 and the second detection circuit 22 of the second detector 20 include the second Hall elements. A specific configuration of the first detection circuits 11 and 21 may be the same as the configuration of the first detection circuit 11 according to the second example shown in FIG. 8. A specific configuration of the second detection circuits 12 and 22 may be the same as the configuration of the second detection circuit 12 according to the second example shown in FIG. 9.

Next, an operation and effect of the position detection device 1 according to the present embodiment will be described. In the present embodiment, the processor 30 generates the first processed signal Sa by the arithmetic processing including determination of a difference between the first detection signal S11 indicating the strength of the component of the first composite magnetic field MF1 in the third direction D3 and the first detection signal S21 indicating the strength of the component of the second composite magnetic field MF2 in the third direction D3. The processor 30 generates the second processed signal Sb by the arithmetic processing including determination of a difference between the second detection signal S12 indicating the strength of the component of the first composite magnetic field MF1 in the fourth direction D4 and the second detection signal S22 indicating the strength of the component of the second composite magnetic field MF2 in the fourth direction D4. The processor 30 then generates the detection value θs having a correspondence with the relative position on the basis of the first and second processed signals Sa and Sb.

According to the present embodiment, an error due to the noise magnetic field Mex can be reduced by generating the first processed signal Sa corresponding to the difference between the first detection signals S11 and S21 and generating the second processed signal Sb corresponding to the difference between the second detection signals S12 and S22. The reason will now be described in detail.

FIG. 10 is an explanatory diagram showing the target magnetic field for the first and second detectors 10 and 20 to detect. In FIG. 10, the arrow denoted by the symbol MFa represents the first partial magnetic field MFa, and the arrow denoted by the symbol MFb represents the second partial magnetic field MFb.

In FIG. 10, the symbol PL represents the reference plane, the symbol P0 represents the reference position, and the arrow denoted by the symbol MFr represents the target magnetic field at the reference position P0. The reference position P0 is an intermediate position between the first and second detection positions P1 and P2. The reference plane PL is a plane parallel to the XZ plane intersecting the magnetic scale 2. The first and second detection positions P1 and P2 and the reference position P0 are all located within the reference plane PL.

The target magnetic field at the reference position P0 will hereinafter be referred to as a reference magnetic field MFr. The direction of the reference magnetic field MFr rotates about the reference position P0 as the relative position changes. The direction of the first partial magnetic field MFa rotates about the first detection position P1 as the relative position changes. The direction of the second partial magnetic field MFb rotates about the second detection position P2 as the relative position changes.

The angle that the direction of the reference magnetic field MFr forms with respect to the fourth direction D4 (Z direction) will now be denoted by the symbol θ. The angle that the direction of the first partial magnetic field MFa forms with respect to the direction of the reference magnetic field MFr will be denoted by the symbol a1. The angle that the direction of the second partial magnetic field MFb forms with respect to the direction of the reference magnetic field MFr will be denoted by the symbol a2. The strength of the first and second partial magnetic fields MFa and MFb will be denoted by the symbol B, and the strength of the noise magnetic field Mex by the symbol Bex. The angle that the direction of the noise magnetic field Mex at the first detection position P1 forms with respect to the fourth direction D4 (the same as the angle that the direction of the noise magnetic field Mex at the second detection position P2 forms with respect to the fourth direction D4) will be denoted by the symbol θex. A strength Bx1 of the component of the first composite magnetic field MF1 detected by the first detector 10 in the third direction D3 (X direction) and a strength Bx2 of the component of the second composite magnetic field MF2 detected by the second detector 20 in the third direction D3 can be expressed by the following Eqs. (1) and (2), respectively:

$$Bx1 = B^*\sin(\theta+\alpha1) + Bex^*\sin\theta ex \quad (1)$$

$$Bx2 = B^*\sin(\theta-\alpha2) + Bex^*\sin\theta ex \quad (2)$$

In Eqs. (1) and (2), Bex*sin θex represents the strength of the component of the noise magnetic field Mex in the third direction D3.

Similarly, a strength Bz1 of the component of the first composite magnetic field MF1 detected by the first detector 10 in the fourth direction D4 (Z direction) and a strength Bz2 of the component of the second composite magnetic field MF2 detected by the second detector 20 in the fourth direction D4 can be expressed by the following Eqs. (3) and (4), respectively:

$$Bz1 = B^*\cos(\theta+\alpha1) + Bex^*\cos\theta ex \quad (3)$$

$$Bz2 = B^*\cos(\theta - \alpha 2) + Bex^*\cos\theta ex \quad (4)$$

In Eqs. (3) and (4), Bex*cos θex represents the strength of the component of the noise magnetic field Mex in the fourth direction D4.

The first detection signal S11 will hereinafter be expressed by the product of the strength Bx1 and a given constant C, or C*Bx1. The first detection signal S21 will be expressed by the product of the strength Bx2 and the given constant C, or C*Bx2. If the first processed signal Sa is the difference S21−S11 itself between the first detection signals S11 and S21, the first processed signal Sa is expressed by the following Eq. (5):

$$\begin{aligned} Sa &= C^*Bx2 - C^*Bx1 \\ &= C(B^*\sin(\theta - \alpha 2) + Bex^*\sin\theta ex) - \\ &\quad C(B^*\sin(\theta + \alpha 1) + Bex^*\sin\theta ex) \\ &= C^*B(\sin(\theta - \alpha 2) - \sin(\theta + \alpha 1)) \end{aligned} \quad (5)$$

The second detection signal S12 will hereinafter be expressed by the product of the strength Bz1 and a given constant C, or C*Bz1. The second detection signal S22 will be expressed by the product of the strength Bz2 and the constant C, or C*Bz2. If the second processed signal Sb is the difference S22−S12 itself between the second detection signals S12 and S22, the second processed signal Sb is expressed by the following Eq. (6):

$$\begin{aligned} Sb &= C^*Bz2 - C^*Bz1 \\ &= C(B^*\cos(\theta - \alpha 2) + Bex^*\cos\theta ex) - \\ &\quad C(B^*\cos(\theta + \alpha 1) + Bex^*\cos\theta ex) \\ &= C^*B(\cos(\theta - \alpha 2) - \cos(\theta + \alpha 1)) \end{aligned} \quad (6)$$

As shown in Eq. (5), determining the difference between the first detection signals S11 and S21 cancels Bex*sin θex, whereby a signal independent of the noise magnetic field Mex is obtained. As shown in Eq. (6), determining the difference between the second detection signals S12 and S22 cancels Bex*cos θex, whereby a signal independent of the noise magnetic field Mex is obtained. An error in the detection value θs due to the noise magnetic field Mex can be reduced by generating the detection value θs on the basis of the first and second processed signals Sa and Sb.

The effect of the present embodiment has so far been described by assuming the case where the direction of the target magnetic field changes ideally. The case where the direction of the target magnetic field changes ideally refers to a case where a relationship between a change in the relative position and a change in the angle that the direction of the target magnetic field at a given position forms with respect to a predetermined direction satisfies linearity. The case where the direction of the target magnetic field changes ideally will hereinafter be referred to as an ideal state. In the ideal state, the angles α1 and α2 shown in FIG. 10 become the same as each other.

At relative positions other than those where θ shown in FIG. 10 is 0°, 90°, 180°, and 270°, the direction of the target magnetic field at a given position deviates from that in the ideal state as the distance from the magnetic scale 2 changes. As a result, the angles α1 and α2 shown in FIG. 10 become different from each other. The values of the respective first and second processed signals Sa and Sb thus deviate from the values in the ideal state, i.e., when the angles α1 and α2 become the same as each other. This can cause an error due to the magnetic scale 2 in the detection value θs. Depending on the positions of the first and second detectors 10 and 20, the error in the detection value θs can further increase. In view of this, the inventors of the present invention have found a condition for reducing the error in the detection value θs by taking into account a plurality of parameters related to the structure of the magnetic scale 2 and the first and second detectors 10 and 20. Now, the results of first and second simulations examining the condition for reducing the error in the detection value θs will be described.

Figure 11:
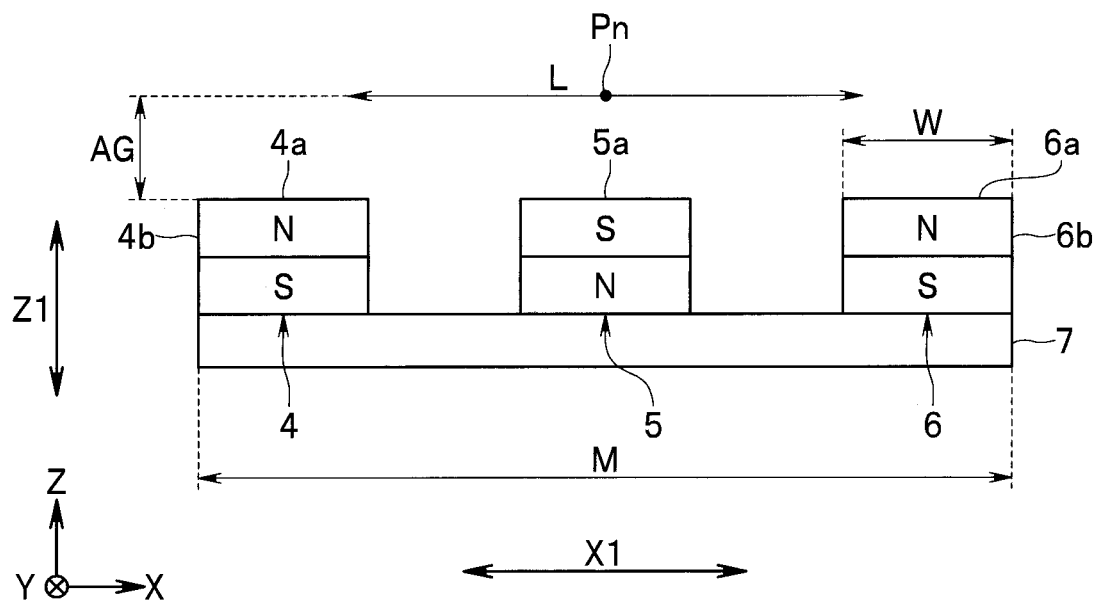
FIG. 11 is an explanatory diagram showing a model of the position detection device in first and second simulations.

A model of a position detection device used in the first and second simulations will initially be described. FIG. 11 is an explanatory diagram showing the model of the position detection device. The model of the position detection device is the one generated on the basis of the position detection device 1 according to the present embodiment. In FIG. 11, the symbol Pn represents a position where the first detector 10 or the second detector 20 (see FIGS. 1 and 2) is arranged, i.e., the first detection position P1 or the second detection position P2. The symbol AG represents the gap from the magnets 4, 5, and 6 to the first detector 10 or the second detector 20 in the second reference direction Z1. In the present embodiment, the gap AG refers to the gap from the top surfaces 4a, 5a, and 6a of the magnets 4, 5, and 6 to the position Pn in the second reference direction Z1.

In FIG. 11, the symbol L indicates the size of the movable range. The symbol M indicates the distance from the first end 4b of the magnet 4 to the second end 6b of the magnet 6. In the first and second simulations, the dimension of the yoke 7 in the first reference direction X1 is set to the same value as the distance M. In the first and second simulations, the dimension of the yoke 7 in the second reference direction Z1 is 2 mm, and the dimension of the yoke 7 in the direction parallel to the Y direction is 5 mm.

In the first and second simulations, the width W of each of the magnets 4, 5, and 6, and the dimension of each of the magnets 4, 5, and 6 in the second reference direction Z1 are ¼ the size L of the movable range. The dimension of each of the magnets 4, 5, and 6 in the direction parallel to the Y direction is 5 mm.

In the first and second simulations, the direction of the noise magnetic field Mex is the −Z direction. The magnitude of the magnetic flux density corresponding to the strength of the noise magnetic field Mex is 5 mT.

Now, a parameter P will be defined by the following Eq. (7):

$$P = (M - W)/(n - 1) \quad (7)$$

In Eq. (7), n is the number of magnets in the magnetic scale 2. In the present embodiment, n is three. The parameter P indicates the distance between the magnets 4 and 5 and the distance between the magnets 5 and 6.

Next, the results of the first simulation will be described. In the first simulation, changes in the direction and strength of the target magnetic field at the position Pn were determined by changing AG, L, M, W, and the relative position. The detection value θs and an error in the detection value θs were determined at each relative position. Values of the detection value θs on a line indicating ideal changes of the detection value θs with respect to changes in the relative position will be referred to as ideal values of the detection value. In the first simulation, a percentage representation of a value obtained by subtracting an ideal value of the detection value at a given relative position from the detection value θs at the relative position, divided by 360° was assumed as the error in the detection value θs. In the first simulation, AG, L, M, and W were changed so that AG/P, or AG(n−1)/(M−W), always has a value of 1.

In the first simulation, AG was changed within the range of 2 to 50 mm. L was changed within the range of 5 to 40 mm. M was changed within the range of 5.25 to 110 mm. W was changed within the range of 1.25 to 10 mm.

Figure 12:
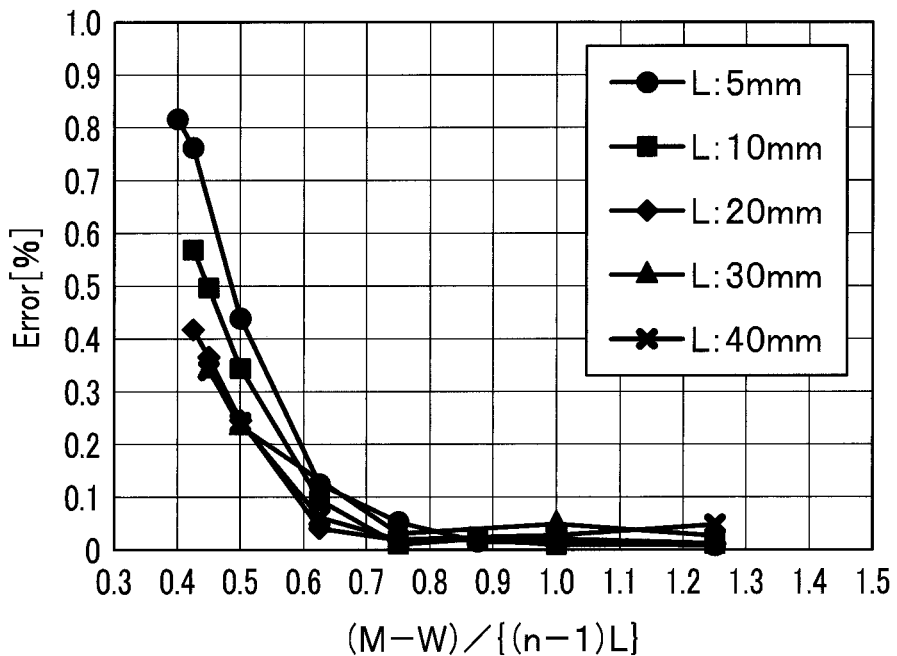
FIG. 12 is a characteristic chart showing the results of the first simulation.

FIG. 12 is a characteristic chart showing the results of the first simulation. From the results of the first simulation, it is found that the error in the detection value θs shows an almost constant tendency with respect to changes in P/L, or (M−W)/{(n−1)L}. In FIG. 12, the horizontal axis indicates (M−W)/{(n−1)L}, and the vertical axis the error in the detection value θs. As shown in FIG. 12, the error in the detection value θs decreases in general as (M−W)/{(n−1)L} increases. (M−W)/{(n−1)L} is preferably 0.50 or more, and more preferably 0.75 or more. The reason will be described later.

If M is too large, the magnetic scale 2 becomes so large that devices to which the position detection device 1 can be applied are limited. If L is too small, the size of the magnetic scale 2 becomes excessively large compared to the movable range. To avoid these, (M−W)/{(n−1)L} is preferably 1.5 or less.

Next, the results of the second simulation will be described. In the second simulation, like the first simulation, errors in the detection value θs were determined by changing AG, L, M, W, and the relative position. In the second simulation, AG, L, M, and W were changed so that P/L, or (M−W)/{(n−1)L}, always has a value of 1.

In the second simulation, AG was changed within the range of 1 to 42.5 mm. L was changed within the range of 5 to 40 mm. M was changed within the range of 11.25 to 90 mm. W was changed within the range of 1.25 to 10 mm.

Figure 13:
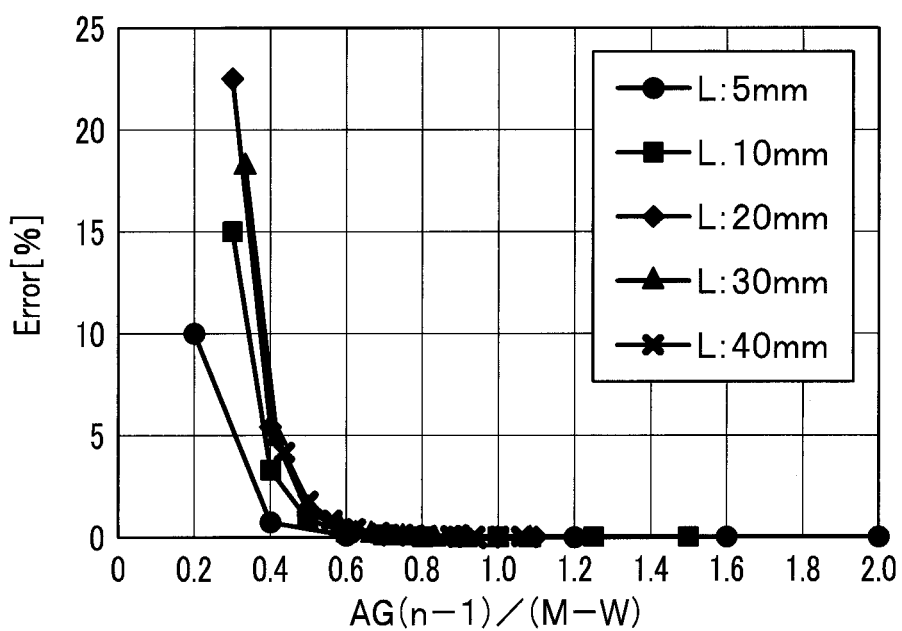
FIG. 13 is a characteristic chart showing the results of the second simulation.
Figure 14:
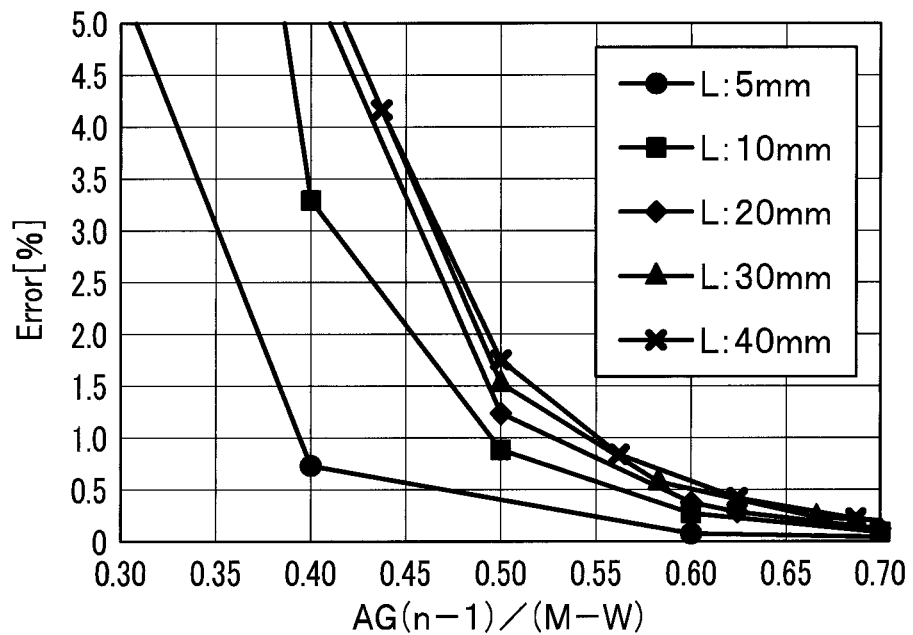
FIG. 14 is a characteristic chart showing a portion of FIG. 13 on an enlarged scale.

FIG. 13 is a characteristic chart showing the results of the second simulation. FIG. 14 is a characteristic chart showing a portion of FIG. 13 on an enlarged scale. From the results of the second simulation, it is found that the error in the detection value θs shows an almost constant tendency with respect to changes in AG/P, or AG(n−1)/(M−W). In FIGS. 13 and 14, the horizontal axis indicates AG(n−1)/(M−W), and the vertical axis the error in the detection value θs. As shown in FIGS. 13 and 14, the error in the detection value θs decreases in general as AG(n−1)/(M−W) increases. AG(n−1)/(M−W) is preferably 0.4 or more, and more preferably 0.5 or more. The reason will be described later.

If AG is too large, the strength of the target magnetic field at the first and second detection positions P1 and P2 becomes so low that the error in the detection value θs due to the noise magnetic field Mex fails to be sufficiently reduced. If M is too small, L decreases as well and devices to which the position detection device 1 can be applied are limited. To avoid these, AG(n−1)/(M−W) is preferably 2 or less.

From the results of the first and second simulations shown in FIGS. 12 to 14, it can be seen that the error in the detection value θs is more susceptible to AG(n−1)/(M−W) than to (M−W)/{(n−1)L}. The error in the detection value θs can thus be sufficiently reduced by locating the first and second detectors 10 and 20 by taking AG(n−1)/(M−W) into account.

In the present embodiment, the first and second detectors 10 and 20 are each arranged, on the basis of the results of the second simulation, to satisfy the following Eq. (8):

$$AG = N(M-W)/(n-1) \quad (8)$$

In Eq. (8), N corresponds to the value on the horizontal axes of FIGS. 13 and 14. N is a number greater than or equal to 0.4 and less than or equal to 2.

According to the present embodiment, the first and second detectors 10 and 20 are each arranged to satisfy Eq. (8), whereby the error in the detection value θs can be sufficiently reduced while reducing an error due to the noise magnetic field Mex. N is preferably a number greater than or equal to 0.5 and less than or equal to 2. N greater than or equal to 0.5 and less than or equal to 2 can further reduce the error in the detection value θs, compared to when N is greater than or equal to 0.4 and less than 0.5.

The first and second detectors 10 and 20 may each be arranged, on the basis of the results of the first simulation, to satisfy the following Eq. (9):

$$0.5 \leq (M-W)/\{(n-1)L\} \leq 1.5 \quad (9)$$

According to the present embodiment, the error in the detection value θs can be reduced further.

As will be described in a second embodiment, Eqs. (8) and (9) also apply if n is other than 3.

In the present embodiment, the magnets 4, 5, and 6 are located apart from each other. However, a distance between adjoining two of the magnets 4, 5, and 6 in the first reference direction X1 may be 0. Each of the magnets 4, 5, and 6 thus has a width W of greater than 0 and less than or equal to M/n.

Next, the effect of the present invention will be further described with reference to the results of a third simulation. Initially, a model of a comparative example used in the third simulation and models of a first and second practical examples will be described. The model of the comparative example is that of a position detection device according to the comparative example, including one detector instead of the first and second detectors 10 and 20 of the present embodiment. In the position detection device of the comparative example, the detector generates first and second detection signals like the first and second detectors 10 and 20 of the present embodiment. In the position detection device of the comparative example, a detection value θs is generated by calculating the arctangent of the ratio of the first detection signal to the second detection signal. In other respects, the configuration of the model of the comparative example is the same as that of the model of the position detection device used in the first and second simulations. The model of the comparative example is configured so that AG is 5 mm, L is 20 mm, and P, or (M−W)/(n−1), is 12.5 mm.

The model of the first and second practical examples has the same configuration as that of the model of the position detection device used in the first and second simulations. Like the model of the comparative example, the model of the first practical example is configured so that AG is 5 mm, L is 20 mm, and P, or (M−W)/(n−1), is 12.5 mm. In the model of the first practical example, AG/P, or AG(n−1)/(M−W), is 0.4. P/L, or (M−W)/{(n−1)L} is 0.625. The model of the first practical example thus satisfies the requirement expressed by Eq. (8) and the requirement expressed by Eq. (9).

The model of the second practical example is configured so that AG is 5 mm, L is 20 mm, and P, or (M−W)/(n−1), is 10 mm. In the model of the second practical example, AG/P, or AG(n−1)/(M−W), is 0.5. P/L, or (M−W)/{(n−1)L} is 0.5. The model of the second practical example thus satisfies the requirement expressed by Eq. (8), the requirement expressed by Eq. (9), and the condition about a desirable N that N is a number greater than or equal to 0.5.

Next, the results of the third simulation will be described. In the third simulation, changes in the direction and strength of the target magnetic field at the position where the first and second detectors 10 and 20 or the detector of the model of the comparative example was located were determined by changing the relative position. The detection value θs and an error in the detection value θs were determined at each relative position. In the third simulation, the direction of the noise magnetic field Mex was the −Z direction. The magnitude of the magnetic flux density corresponding to the strength of the noise magnetic field Mex is 5 mT.

In the model of the comparative example, the relative position is defined with a state where the magnet 5 and the detector are located at the same position in the first reference direction X1 as the origin. More specifically, in the model of the comparative example, the relative position in the state where the magnet 5 and the detector are located at the same position in the first reference direction X1 is assumed as 0 mm. The relative position in a state where the detector is on the −X direction side of the magnet 5 is expressed by a negative value, and the relative position in a state where the detector is on the X direction side of the magnet 5 is expressed by a positive value.

In the models of the first and second practical examples, the relative position is defined with a state where the magnet 5 and an intermediate position between the first and second detection positions P1 and P2 are located at the same position in the first reference direction X1 as the origin. More specifically, in the models of the first and second practical examples, the relative position in the state where the magnet 5 and the intermediate position are located at the same position in the first reference direction X1 is assumed as 0 mm. The relative position in a state where the intermediate position is on the −X direction side of the magnet 5 is expressed by a negative value, and the relative position in a state where the intermediate position is on the X direction side of the magnet 5 is expressed by a positive value.

Using the models of the first and second practical examples, a difference between the magnetic flux density corresponding to the strength of the component of the target magnetic field in the third direction D3 (X direction) at the first detection position P1 and the magnetic flux density corresponding to the strength of the component of the target magnetic field in the third direction D3 at the second detection position P2 was determined. Using the models of the first and second practical examples, a difference between the magnetic flux density corresponding to the strength of the component of the target magnetic field in the fourth direction D4 (Z direction) at the first detection position P1 and the magnetic flux density corresponding to the strength of the component of the target magnetic field in the fourth direction D4 at the second detection position P2 was determined. A difference between the magnetic flux densities corresponding to the strength of two components in the same direction will hereinafter be referred to as a differential magnetic field density.

Figure 15:
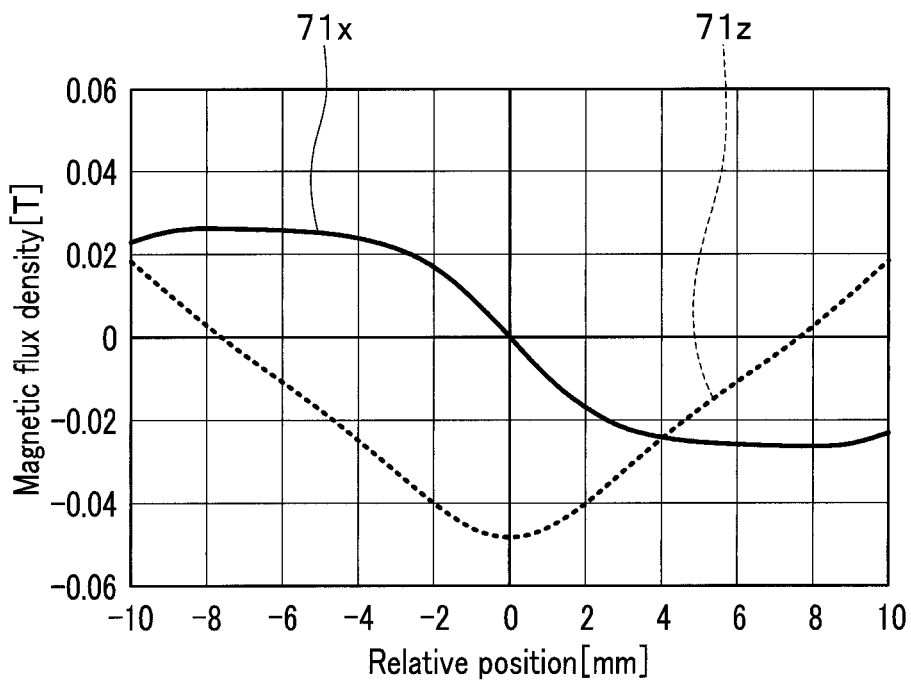
FIG. 15 is a characteristic chart showing a magnetic flux density in a model of a comparative example in a third simulation.
Figure 16:
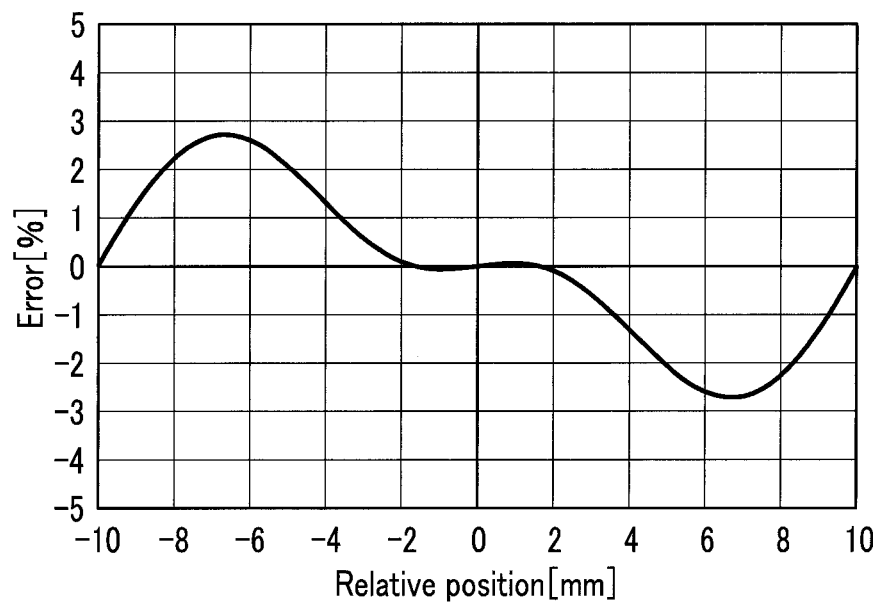
FIG. 16 is a characteristic chart showing an error in a detection value of the model of the comparative example in the third simulation.

FIG. 15 is a characteristic chart showing the magnetic flux density according to the model of the comparative example. FIG. 16 is a characteristic chart showing the error in the detection value θs according to the model of the comparative example. In FIGS. 15 and 16, the horizontal axis indicates the relative position. In FIG. 15, the vertical axis indicates the magnetic flux density. In FIG. 15, the curve denoted by the reference numeral 71x represents the magnetic flux density corresponding to the strength of the component of the target magnetic field in the third direction D3 (X direction) at the position where the detector is arranged. The curve denoted by the reference numeral 71z represents the magnetic flux density corresponding to the strength of the component of the target magnetic field in the fourth direction D4 (Z direction) at the position where the detector is arranged. In FIG. 16, the vertical axis indicates the error in the detection value θs. In the model of the comparative example, the error in the detection value θs was 2.71%.

Figure 17:
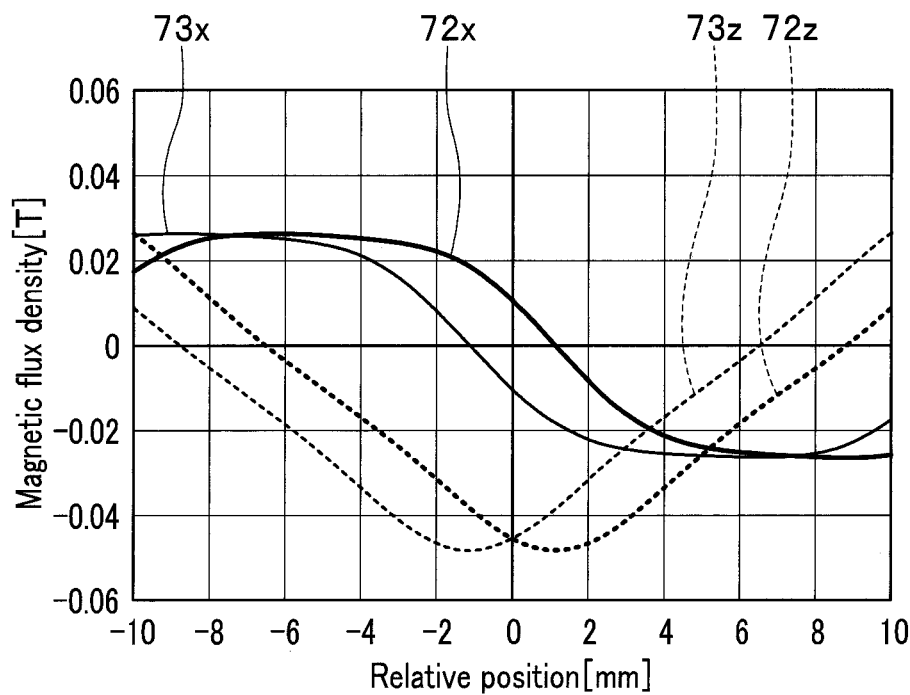
FIG. 17 is a characteristic chart showing a magnetic flux density in a model of a first practical example in the third simulation.
Figure 18:
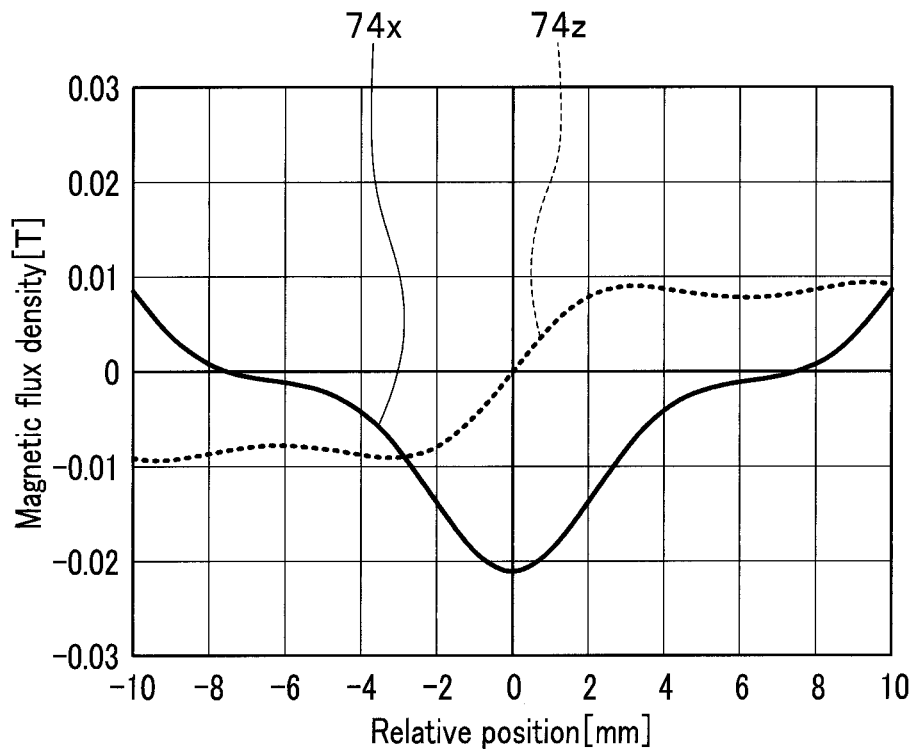
FIG. 18 is a characteristic chart showing a differential magnetic flux density in the model of the first practical example in the third simulation.
Figure 19:
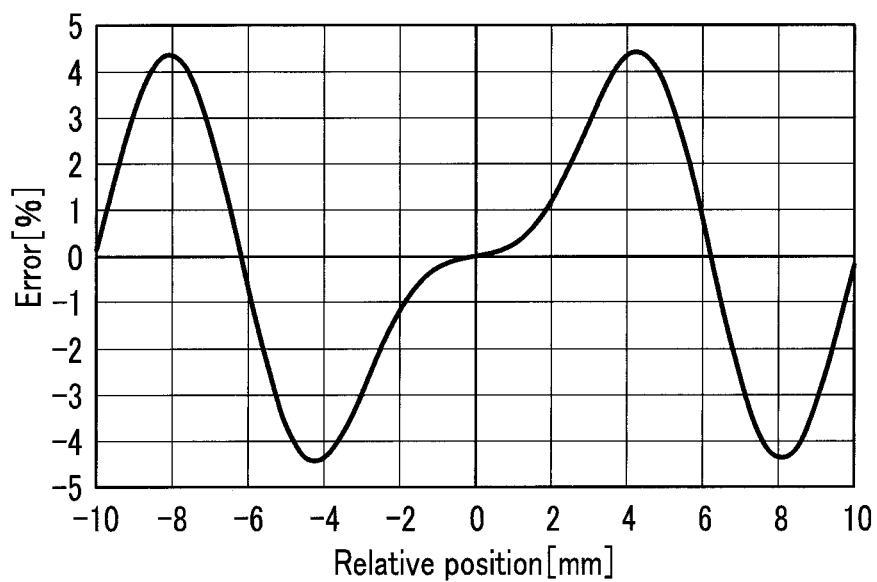
FIG. 19 is a characteristic chart showing an error in a detection value of the model of the first practical example in the third simulation.

FIG. 17 is a characteristic chart showing the magnetic flux density according to the model of the first practical example. FIG. 18 is a characteristic chart showing the differential magnetic flux density according to the model of the first practical example. FIG. 19 is a characteristic chart showing the error in the detection value θs according to the model of the first practical example. In FIGS. 17 to 19, the horizontal axis indicates the relative position. In FIGS. 17 and 18, the vertical axis indicates the magnetic flux density. In FIG. 17, the curve denoted by the reference numeral 72x represents the magnetic flux density corresponding to the strength of the component of the target magnetic field in the third direction D3 (X direction) at the first detection position P1. The curve denoted by the reference numeral 73x represents the magnetic flux density corresponding to the strength of the component of the target magnetic field in the third direction D3 at the second detection position P2. The curve denoted by the reference numeral 72z represents the magnetic flux density corresponding to the strength of the component of the target magnetic field in the fourth direction D4 (Z direction) at the first detection position P1. The curve denoted by the reference numeral 73z represents the magnetic flux density corresponding to the strength of the component of the target magnetic field in the fourth direction D4 at the second detection position P2.

In FIG. 18, the curve denoted by the reference numeral 74x represents the differential magnetic flux density between the components in the third direction D3 (X direction). The curve denoted by the reference numeral 74z represents the difference magnetic flux density between the components in the fourth direction D4 (Z direction). In FIG. 19, the vertical axis indicates the error in the detection value θs. In the model of the first practical example, the error in the detection value θs was 4.38%.

Figure 20:
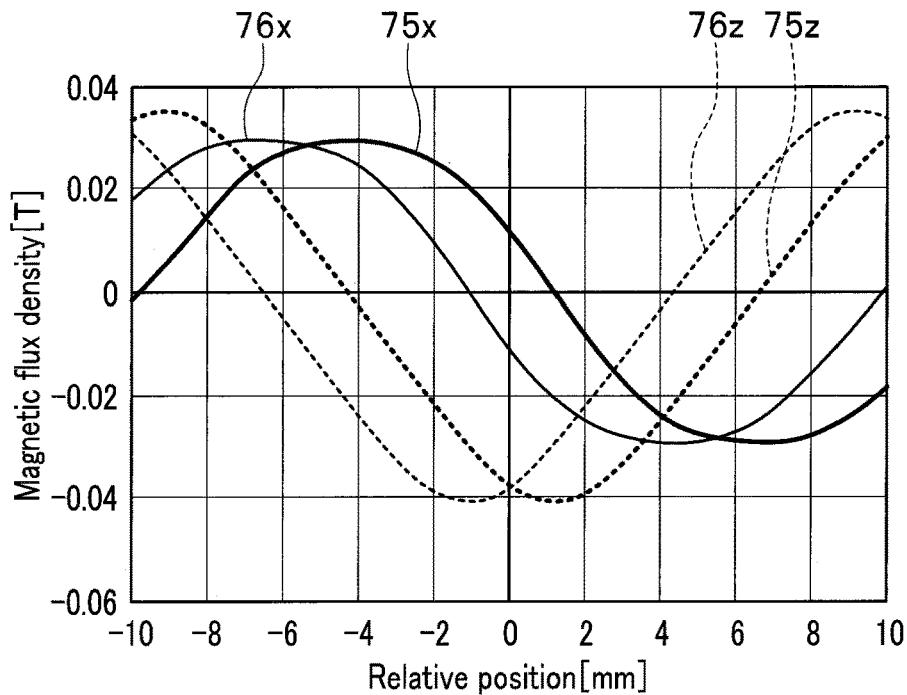
FIG. 20 is a characteristic chart showing a magnetic flux density in a model of a second practical example in the third simulation.
Figure 21:
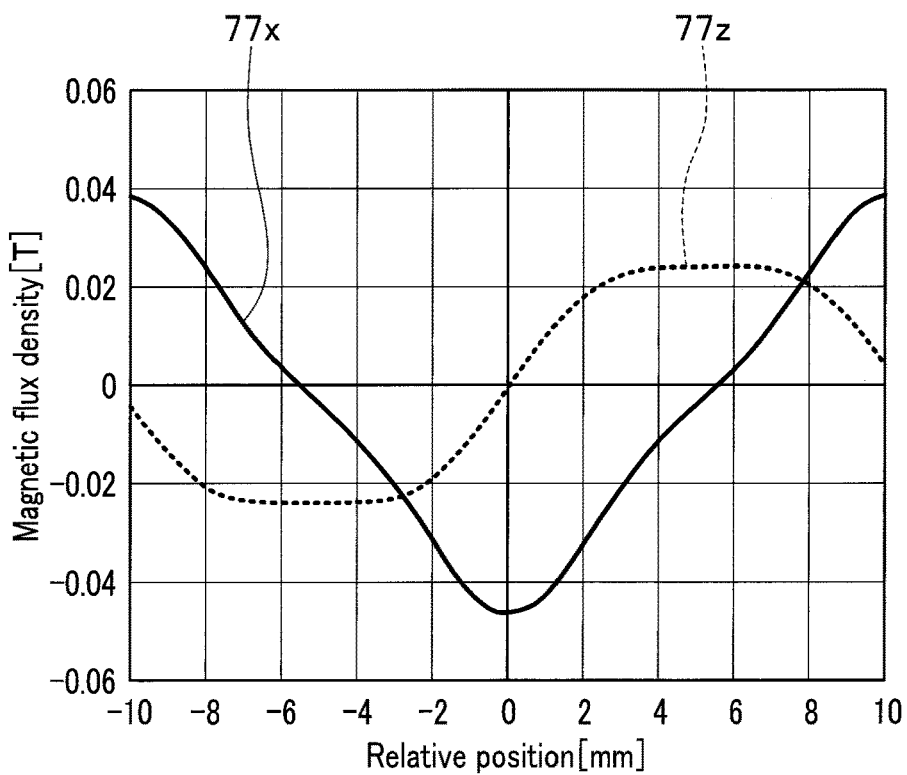
FIG. 21 is a characteristic chart showing a differential magnetic flux density in the model of the second practical example in the third simulation.
Figure 22:
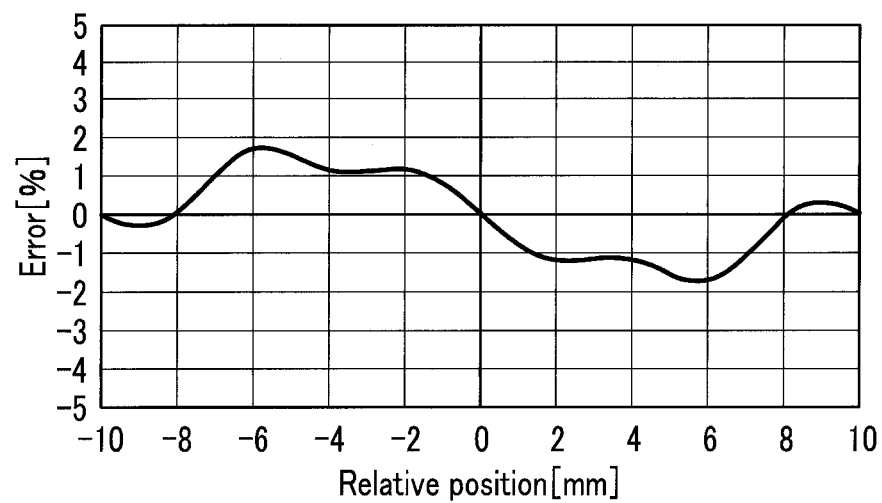
FIG. 22 is a characteristic chart showing an error in a detection value of the model of the second practical example in the third simulation.

FIG. 20 is a characteristic chart showing the magnetic flux density according to the model of the second practical example. FIG. 21 is a characteristic chart showing the differential magnetic flux density according to the model of the second practical example. FIG. 22 is a characteristic chart showing the error in the detection value θs according to the model of the second practical example. In FIGS. 20 to 22, the horizontal axis indicates the relative position. In FIGS. 20 and 21, the vertical axis indicates the magnetic flux density. In FIG. 20, the curve denoted by the reference numeral 75x represents the magnetic flux density corresponding to the strength of the component of the target magnetic field in the third direction D3 (X direction) at the first detection position P1. The curve denoted by the reference numeral 76x represents the magnetic flux density corresponding to the strength of the component of the target magnetic field in the third direction D3 at the second detection position P2. The curve denoted by the reference numeral 75z represents the magnetic flux density corresponding to the strength of the component of the target magnetic field in the fourth direction D4 (Z direction) at the first detection position P1. The curve denoted by the reference numeral 76z represents the magnetic flux density corresponding to the strength of the component of the target magnetic field in the fourth direction D4 at the second detection position P2.

In FIG. 21, the curve denoted by the reference numeral 77x represents the differential magnetic flux density between the components in the third direction D3 (X direction). The curve denoted by the reference numeral 77z represents the difference magnetic flux density between the components in the fourth direction D4 (Z direction). In FIG. 22, the vertical axis indicates the error in the detection value θs. In the model of the second practical example, the error in the detection value θs was 1.75%.

As can be seen from the results of the third simulation shown in FIGS. 15 to 22, the error in the detection value θs according to the model of the second practical example is smaller than that of the model of the first practical example. As shown in FIGS. 17 and 20, in the model of the second practical example, the waveforms of the magnetic flux densities corresponding to the strength of the components of the target magnetic field in one direction are less distorted than in the model of the first practical example. This reduces the distortion of the waveforms of the first detection signals S11 and S21 and the second detection signals S12 and S22, and as a result, the distortion of the waveforms of the first and second processed signals Sa and Sb is reduced as well. The waveforms of the differential magnetic flux densities shown in FIG. 21 correspond to the waveforms of the first and second processed signals Sa and Sb according to the model of the second practical example. In the model of the second practical example, the error in the detection value θs is thus small compared to the model of the first practical example.

The error in the detection value θs according to the model of the second practical example is smaller than that of the model of the comparative example. The results of the third simulation show that, according to the present embodiment, the error in the detection value θs can be sufficiently reduced while reducing an error due to the noise magnetic field Mex by arranging the first and second detectors 10 and 20 to satisfy the requirement of Eq. (8), generating the first processed signal Sa corresponding to a difference between the first detection signals S11 and S21, and generating the second processed signal Sb corresponding to a difference between the second detection signals S12 and S22.

While the error in the detection value θs according to the model of the second practical example is smaller than that of the model of the comparative example, the error in the detection value θs according to the model of the first practical example is greater than that of the model of the comparative example. However, according to the present embodiment, the error due to the noise magnetic field Mex can be reduced as described above. Some position detection devices are used under a condition that the error in the detection value θs only need to be somewhat small and higher priority is given to the reduction of the error due to the noise magnetic field Mex. In such a case, the position detection device 1 according to the present embodiment can be used even if the error in the detection value θs is relatively large like the model of the first practical example.

Second Embodiment

Figure 23:
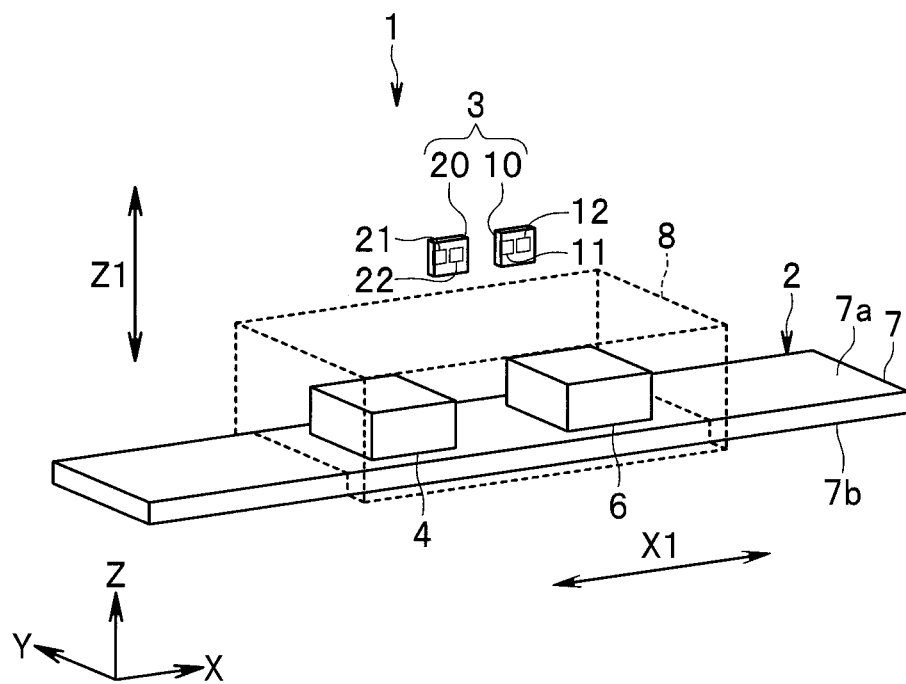
FIG. 23 is a perspective view showing a schematic configuration of a position detection device according to a second embodiment of the invention.

A second embodiment of the present invention will now be described with reference to FIG. 23. FIG. 23 is a perspective view showing a schematic configuration of a position detection device according to the present embodiment. A position detection device 1 according to the present embodiment is different from that of the first embodiment in the following respects. In the present embodiment, the magnetic scale 2 does not include the magnet 5. In other words, in the present embodiment, the magnetic scale 2 includes two magnets 4 and 6 as the plurality of magnets. In the present embodiment, the N and S poles of the magnet 6 are arranged in this order in the Z direction. In other respects, the configuration of the position detection device 1 according to the present embodiment is the same as that of the first embodiment.

Figure 24:
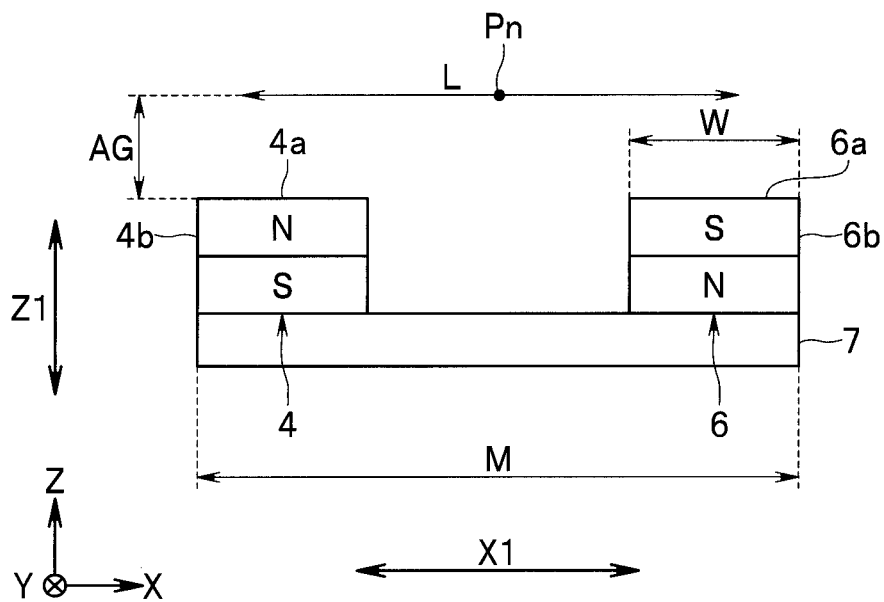
FIG. 24 is an explanatory diagram showing a model of the position detection device in fourth and fifth simulations.

Next, the results of fourth and fifth simulations examining a condition for reducing the error in the detection value θs will be described. A model of a position detection device used in the fourth and fifth simulations will initially be described. FIG. 24 is an explanatory diagram showing the model of the position detection device. The model of the position detection device is the one generated on the basis of the position detection device 1 according to the present embodiment. In FIG. 24, the symbol Pn represents a position where the first detector 10 or the second detector 20 (see FIG. 23) is arranged, i.e., the first detection position P1 or the second detection position P2. The symbol AG represents the gap from the magnets 4 and 6 to the first detector 10 or the second detector 20 in the second reference direction Z1. In the present embodiment, the gap AG refers to the gap from the top surfaces 4a and 6a of the magnets 4 and 6 to the position Pn in the second reference direction Z1.

In FIG. 24, the symbol L indicates the size of the movable range. The symbol M indicates the distance from the first end 4b of the magnet 4 to the second end 6b of the magnet 6. In the fourth and fifth simulations, the width W of each of the magnets 4 and 6, and the dimension of each of the magnets 4 and 6 in the second reference direction Z1 are ⅕ the size L of the movable range. The dimension of each of the magnets 4 and 6 in the direction parallel to the Y direction is 5 mm. The conditions about the yoke 7 and the noise magnetic field Mex in the fourth and fifth simulations are the same as those of the first and second simulations described in the first embodiment.

Next, the results of the fourth simulation will be described. In the fourth simulation, like the first simulation according to the first embodiment, the error in the detection value θs was determined by changing AG, L, M, W, and the relative position. In the fourth simulation, AG, L, M, and W were changed so that AG/P, or AG(n−1)/(M−W), always has a value of 1.

In the fourth simulation, AG was changed within the range of 4 to 33 mm. L was changed within the range of 10 to 30 mm. M was changed within the range of 6 to 39 mm. W was changed within the range of 2 to 6 mm.

Figure 25:
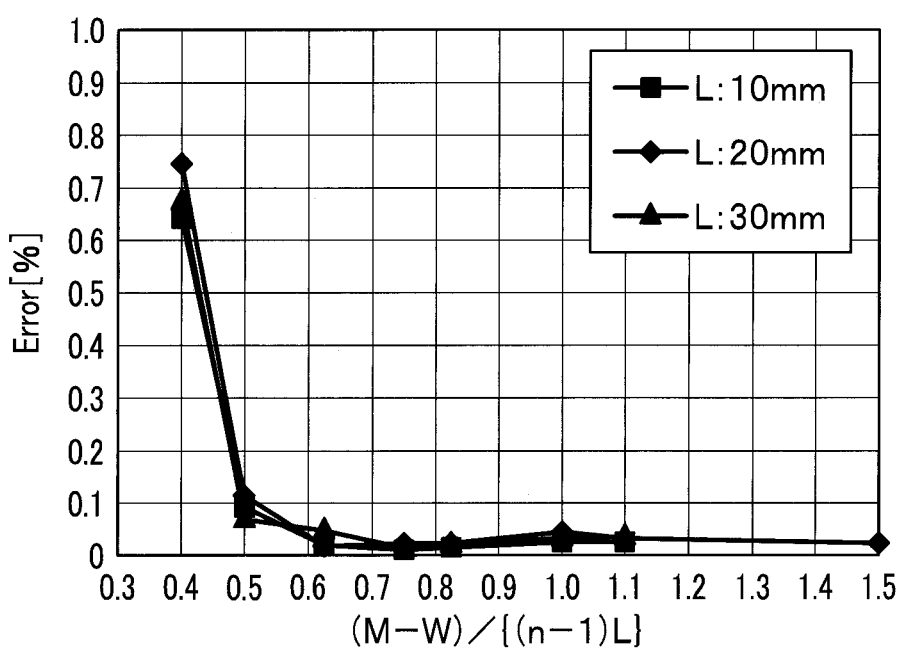
FIG. 25 is a characteristic chart showing the results of a fourth simulation.

FIG. 25 is a characteristic chart showing the results of the fourth simulation. From the results of the fourth simulation, it is found that the error in the detection value θs shows an almost constant tendency with respect to changes in P/L, or (M−W)/{(n−1)L}. In FIG. 25, the horizontal axis indicates (M−W)/{(n−1)L}, and the vertical axis the error in the detection value θs. As shown in FIG. 25, the error in the detection value θs decreases in general as (M−W)/{(n−1)L} increases. (M−W)/{(n−1)L} is preferably 0.50 or more, and more preferably 0.75 or more. The reason will be described later. As described in the first embodiment, (M−W)/{(n−1)L} is preferably 1.5 or less.

Next, the results of the fifth simulation will be described. In the fifth simulation, like the second simulation in the first embodiment, the error in the detection value θs was determined by changing AG, L, M, W, and the relative position. In the fifth simulation, AG, L, M, and W were changed so that P/L, or (M−W)/{(n−1)L}, always has a value of 1.

In the fifth simulation, AG was changed within the range of 2 to 60 mm. L was changed within the range of 10 to 30 mm. M was changed within the range of 12 to 36 mm. W was changed within the range of 2 to 6 mm.

Figure 26:
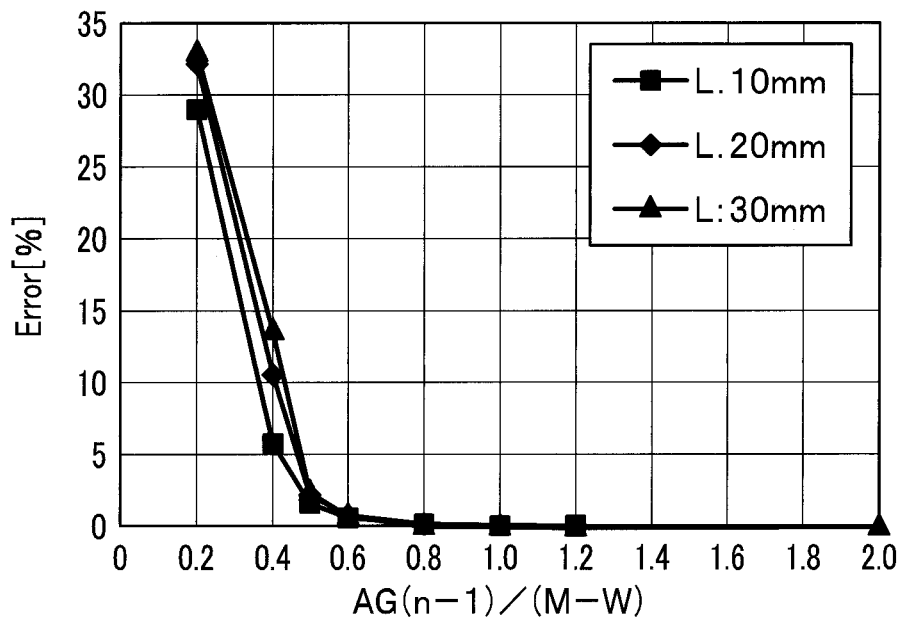
FIG. 26 is a characteristic chart showing the results of a fifth simulation.
Figure 27:
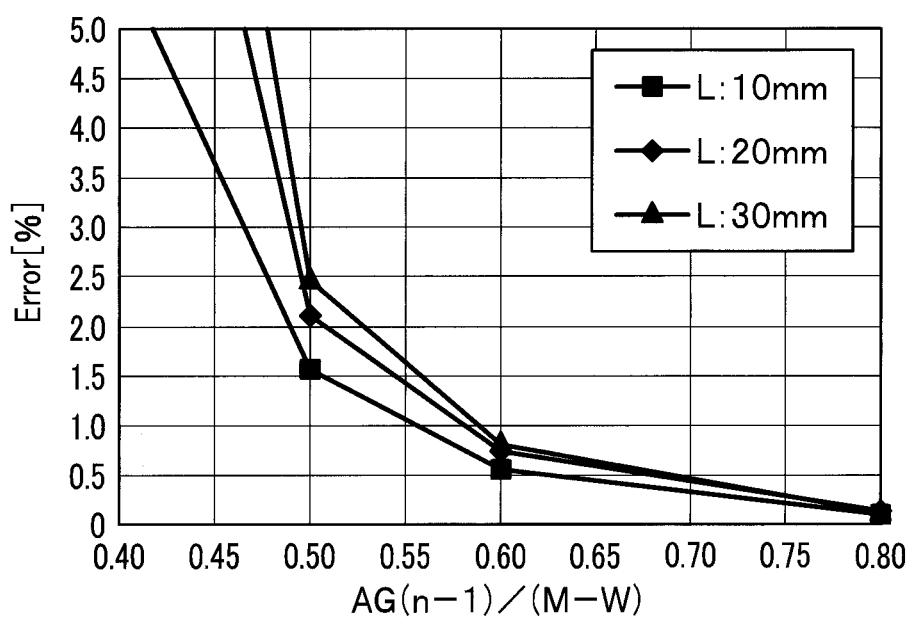
FIG. 27 is a characteristic chart showing a portion of FIG. 26 on an enlarged scale.

FIG. 26 is a characteristic chart showing the results of the fifth simulation. FIG. 27 is a characteristic chart showing a portion of FIG. 26 on an enlarged scale. From the results of the fifth simulation, it is found that the error in the detection value θs shows an almost constant tendency with respect to changes in AG/P, or AG(n−1)/(M−W). In FIGS. 26 and 27, the horizontal axis indicates AG(n−1)/(M−W), and the vertical axis the error in the detection value θs. As shown in FIGS. 26 and 27, the error in the detection value θs decreases in general as AG(n−1)/(M−W) increases. AG(n−1)/(M−W) is preferably 0.4 or more, and more preferably 0.5 or more. The reason will be described later. As described in the first embodiment, AG(n−1)/(M−W) is preferably 2 or less.

In the present embodiment, the first and second detectors 10 and 20 are each located, on the basis of the results of the fifth simulation, to satisfy Eq. (8) in the first embodiment. According to the present embodiment, the first and second detectors 10 and 20 are each arranged to satisfy Eq. (8), whereby the error in the detection value θs can be sufficiently reduced while reducing an error due to the noise magnetic field Mex. N is preferably a number greater than or equal to 0.5 and less than or equal to 2. N greater than or equal to 0.5 and less than or equal to 2 can further reduce the error in the detection value θs, compared to when N is greater than or equal to 0.4 and less than 0.5.

The first and second detectors 10 and 20 may each be arranged, on the basis of the results of the fourth simulation, to satisfy Eq. (9) in the first embodiment. According to the present embodiment, the error in the detection value θs can be reduced further.

As described above, Eqs. (8) and (9) also apply to a case where n is 2. Even if n is 4 or more, the numbers of peaks in the waveforms of the magnetic flux densities corresponding to the strength of the components of the target magnetic field in one direction change with n. However, how the waveforms of the magnetic flux densities are distorted is similar to when n is 3. Eqs. (8) and (9) therefore also apply to a case where n is 4 or more.

Now, desirable values of (M−W)/{(n−1)L} and AG(n−1)/(M−W) will be described. Desirable values of (M−W)/{(n−1)L} will initially be described. (M−W)/{(n−1)L} preferably has a value such that the error in the detection value θs becomes 0.5% or less, and more preferably such that the error in the detection value θs becomes 0.1% or less, regardless of the value of n. From the results of the first simulation shown in FIG. 12 according to the first embodiment and the results of the fourth simulation shown in FIG. 25 in the present embodiment, (M−W)/{(n−1)L} is preferably 0.50 or more, and more preferably 0.75 or more.

Next, desirable values of AG(n−1)/(M−W), i.e., N will be described. AG(n−1)/(M−W) preferably has a value such that the error in the detection value θs decreases clearly, regardless of the value of n. From the results of the second simulation shown in FIGS. 13 and 14 in the first embodiment and the results of the fifth simulation shown in FIGS. 26 and 27 in the present embodiment, the error in the detection value θs decreases clearly if AG(n−1)/(M−W) is 0.4 or more, compared to when the AG(n−1)/(M−W) is less than 0.4. Moreover, AG(n−1)/(M−W) more preferably has a value such that the error in the detection value θs becomes 2.5% or less. From the results of the second simulation shown in FIGS. 13 and 14 in the first embodiment and the results of the fifth simulation shown in FIGS. 26 and 27 in the present embodiment, AG(n−1)/(M−W) preferably has a value of 0.5 or more.

The configuration, operation and effects of the present embodiment are otherwise the same as those of the first embodiment.

Third Embodiment

Figure 28:
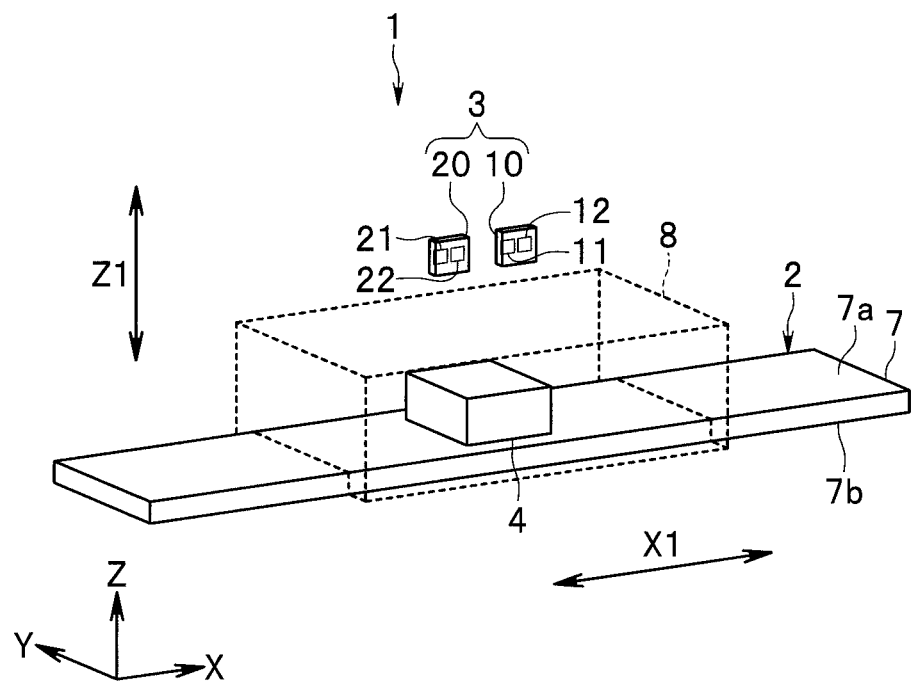
FIG. 28 is a perspective view showing a schematic configuration of a position detection device according to a third embodiment of the invention.

A third embodiment of the present invention will now be described with reference to FIG. 28. FIG. 28 is a perspective view showing a schematic configuration of a position detection device according to the present embodiment. A position detection device 1 according to the present embodiment is different from that of the first embodiment in the following respects. In the present embodiment, the magnetic scale 2 does not include the magnets 5 and 6. Specifically, in the present embodiment, the magnetic scale 2 includes one magnet 4. The magnet 4 is magnetized in one direction parallel to the second reference direction Z1. As shown in FIG. 2 according to the first embodiment, the magnet 4 has an N pole and an S pole arranged in this order in the −Z direction.

Figure 29:
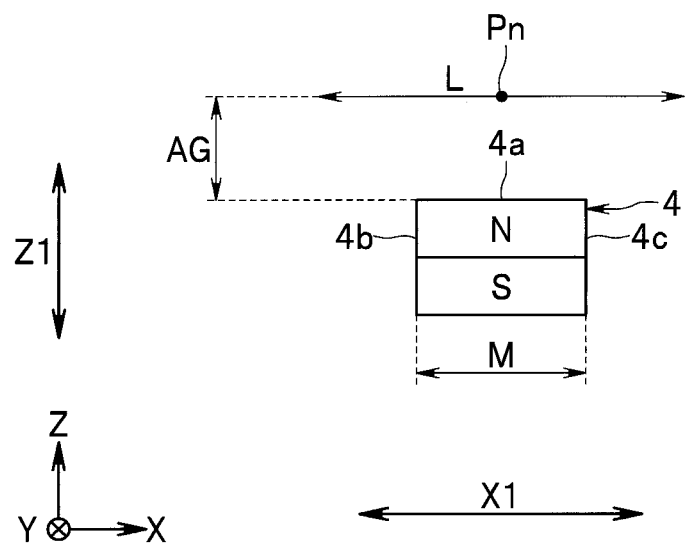
FIG. 29 is an explanatory diagram showing a model of the position detection device in a sixth simulation.

In the present embodiment, the magnet 4 has a second end 4c in addition to the top surface 4a and the first end 4b. The first end 4b and the second end 4c are two ends located on opposite sides in the first reference direction X1. The top surface 4a and the first and second ends 4b and 4c are shown in FIG. 29 to be described later. In other respects, the configuration of the position detection device 1 according to the present embodiment is the same as that of the first embodiment.

Next, the results of a sixth simulation examining a condition for reducing the error in the detection value θs will be described. A model of a position detection device used in the sixth simulation will initially be described. FIG. 29 is an explanatory diagram showing the model of the position detection device. The model of the position detection device is the one generated on the basis of the position detection device 1 according to the present embodiment. Note that the model of the position detection device does not include the yoke 7. In FIG. 29, the symbol Pn represents a position where the first detector 10 or the second detector 20 (see FIG. 28) is located, i.e., the first detection position P1 or the second detection position P2. The symbol AG represents the gap from the magnet 4 to the first detector 10 or the second detector 20 in the second reference direction Z1. In the present embodiment, the gap AG refers to the gap from the top surface 4a of the magnet 4 to the position Pn in the second reference direction Z1.

In FIG. 29, the symbol L indicates the size of the movable range. In the sixth simulation, the size L of the movable range is set to 10 mm. In FIG. 29, the symbol M denotes the distance from the first end 4b to the second end 4c of the magnet 4. The distance M is equal to the width W of the magnet 4. In the sixth simulation, the distance M is 10 mm, and the dimension of the magnet 4 in the second reference direction Z1 and the dimension of the magnet 4 in the direction parallel to the Y direction are 5 mm. The condition about the noise magnetic field Mex in the sixth simulation is the same as those of the first and second simulations described in the first embodiment.

Figure 30:
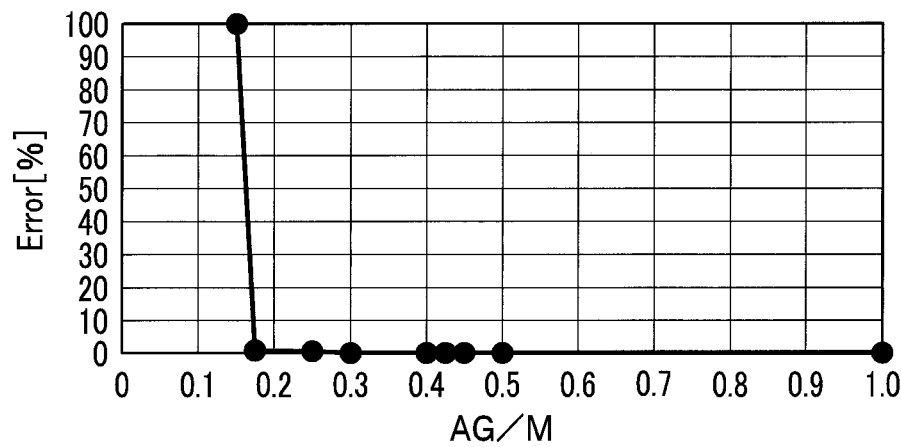
FIG. 30 is a characteristic chart showing the results of a sixth simulation.
Figure 31:
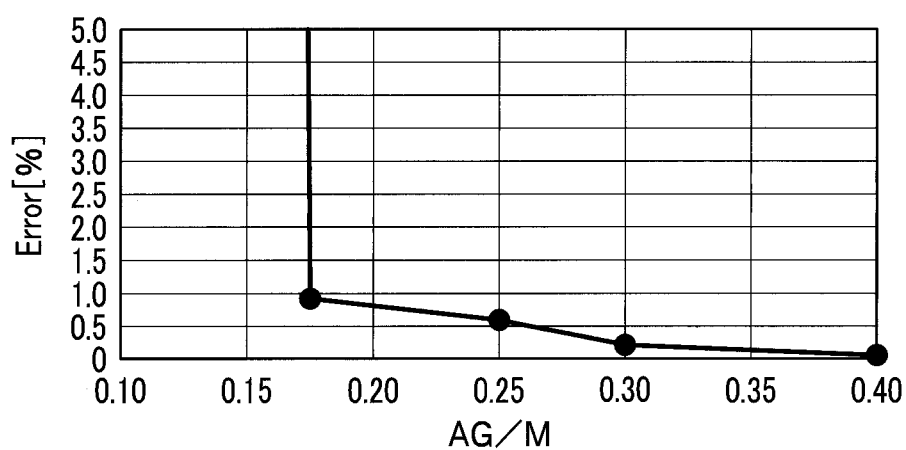
FIG. 31 is a characteristic chart showing a portion of FIG. 30 on an enlarged scale.

Next, the results of the sixth simulation will be described. In the sixth simulation, the error in the detection value θs was determined by changing AG and the relative position. AG was changed within the range of 1.5 to 10 mm. FIG. 30 is a characteristic chart showing the results of the sixth simulation. FIG. 31 is a characteristic chart showing a portion of FIG. 30 on an enlarged scale. From the results of the sixth simulation, it is found that the error in the detection value θs shows an almost constant tendency with respect to changes in AG/M. In FIGS. 30 and 31, the horizontal axis indicates AG/M, and the vertical axis the error in the detection value θs. As shown in FIGS. 30 and 31, the error in the detection value θs decreases in general as AG/M increases. AG/M preferably has a value such that the error in the detection value θs decreases clearly, and more preferably a value such that the error in the detection value θs becomes 0.5% or less. From the results of the sixth simulation, AG/M is preferably 0.175 or more, and more preferably 0.3 or more.

If AG is too large or M is too small, the strength of the target magnetic field at the first and second detection positions P1 and P2 becomes so low that the error in the detection value θs due to the noise magnetic field Mex is unable to be sufficiently reduced. If M is too small, L decreases as well and devices to which the position detection device 1 can be applied are limited. To avoid these, AG/M is preferably 2 or less.

In the present embodiment, the first and second detectors 10 and 20 are each located, on the basis of the results of the sixth simulation, to satisfy the following Eq. (10):

$$0.175M \leq AG \leq 2M \tag{10}$$

According to the present embodiment, the first and second detectors 10 and 20 are each arranged to satisfy Eq. (10), whereby the error in the detection value θs can be sufficiently reduced while reducing an error due to the noise magnetic field Mex.

The configuration, operation and effects of the present embodiment are otherwise the same as those of the first embodiment.

Fourth Embodiment

Figure 32:
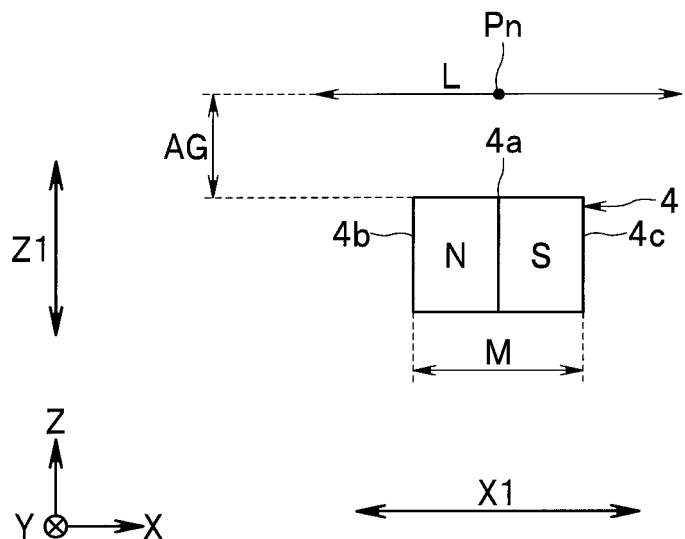
FIG. 32 is an explanatory diagram showing a model of the position detection device in a seventh simulation.

A fourth embodiment of the present invention will now be described. A position detection device 1 according to the present embodiment is different from that of the third embodiment in the following respects. The magnet 4 is magnetized in one direction parallel to the first reference direction X1. In the present embodiment, the magnet 4 has an N pole and an S pole arranged in this order in the −X direction. The magnet 4 of the present embodiment is shown in FIG. 32 to be described later. In other respects, the configuration of the position detection device 1 according to the present embodiment is the same as that of the third embodiment.

Next, the results of a seventh simulation examining a condition for reducing the error in the detection value θs will be described. A model of a position detection device used in the seventh simulation will initially be described. FIG. 32 is an explanatory diagram showing the model of the position detection device. The model of the position detection device is the one generated on the basis of the position detection device 1 according to the present embodiment. Note that the model of the position detection device does not include the yoke 7. In FIG. 32, the symbol Pn represents a position where the first detector 10 or the second detector 20 (see FIG. 28 in the third embodiment) is located, i.e., the first detection position P1 or the second detection position P2. The symbol AG represents the gap from the magnet 4 to the first detector 10 or the second detector 20 in the second reference direction Z1.

In FIG. 32, the symbol L indicates the size of the movable range. The symbol M denotes the distance from the first end 4b to the second end 4c of the magnet 4. The other conditions about the magnet 4 and the conditions about the noise magnetic field Mex in the seventh simulation are the same as those of the sixth simulation described in the third embodiment.

Figure 33:
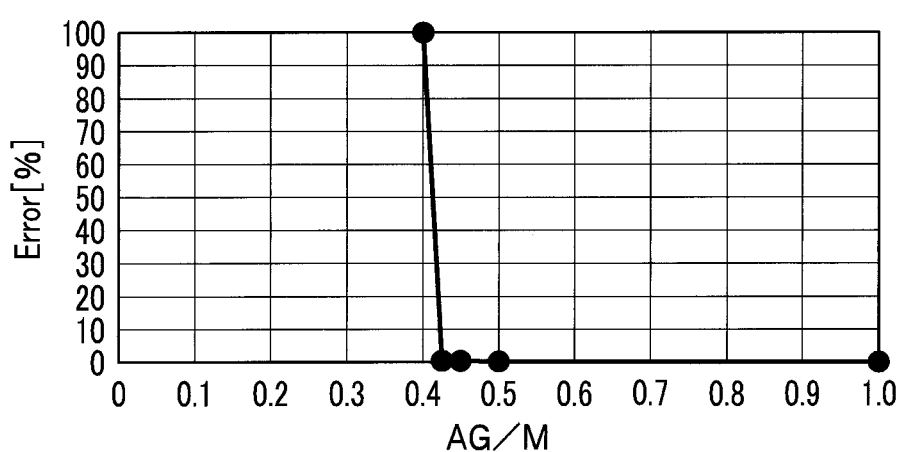
FIG. 33 is a characteristic chart showing the results of a seventh simulation.
Figure 34:
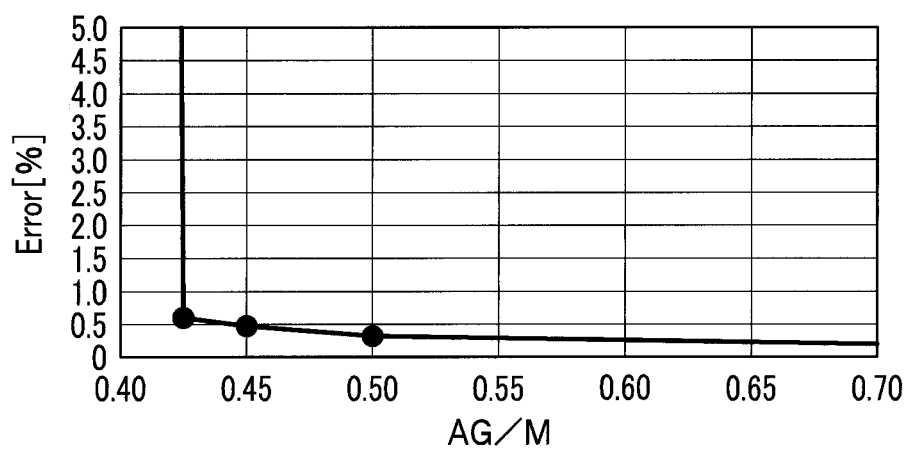
FIG. 34 is a characteristic chart showing a portion of FIG. 33 on an enlarged scale.

Next, the results of the seventh simulation will be described. In the seventh simulation, the error in the detection value θs was determined by changing AG and the relative position. AG was changed within the range of 4 to 10 mm. FIG. 33 is a characteristic chart showing the results of the seventh simulation. FIG. 34 is a characteristic chart showing a portion of FIG. 33 on an enlarged scale. From the results of the seventh simulation, like the results of the sixth simulation, it is found that the error in the detection value θs shows an almost constant tendency with respect to changes in AG/M. In FIGS. 33 and 34, the horizontal axis indicates AG/M, and the vertical axis the error in the detection value θs. As shown in FIGS. 33 and 34, the error in the detection value θs decreases in general as AG/M increases. AG/M preferably has a value such that the error in the detection value θs decreases clearly, and more preferably a value such that the error in the detection value θs becomes 0.5% or less. From the results of the seventh simulation, AG/M is preferably 0.425 or more, and more preferably 0.45 or more. Like the third embodiment, AG/M is preferably 2 or less.

In the present embodiment, the first and second detectors 10 and 20 are each located, on the basis of the results of the seventh simulation, to satisfy the following Eq. (11):

$$0.425M \leq AG \leq 2M \tag{11}$$

According to the present embodiment, the first and second detectors 10 and 20 are each arranged to satisfy Eq. (11), whereby the error in the detection value θs can be sufficiently reduced while reducing an error due to the noise magnetic field Mex.

The configuration, operation and effects of the present embodiment are otherwise the same as those of the third embodiment.

The present invention is not limited to the foregoing embodiments, and various modifications may be made thereto. The number of magnets in the magnetic scale 2 and the number and layout of detectors in the magnetic sensor 3 are not limited to the examples described in the embodiments but may be freely determined as long as the requirements set forth in the claims are satisfied. For example, the magnetic scale 2 may include four or more magnets. In such a case, the range of the detection value θs may be wider than 0° to 360°.

The magnetic sensor 3 may include four detectors as the plurality of detectors. In such a case, the four detectors may be arranged in a row in the first reference direction X1. Alternatively, two detectors may be arranged in a row in the first reference direction X1, and, on the Z direction side of the row, the other two may be arranged in a row in the first reference direction X1.

At least some of the plurality of detectors may be located at different positions in a direction parallel to the Y direction. In such a case, the strengths of the target magnetic fields detected by the respective plurality of detectors may be equal, or almost equal with each other.

The plurality of detectors may each include either at least one first magnetic detection element or at least one second magnetic detection element. In such a case, the plurality of detectors each include either a first detection circuit that generates a first detection signal or a second detection circuit that generates a second detection signal. In such a case, the processor 30 may generate either one of the first and second processed signals Sa and Sb. More specifically, the processor 30 may generate one processed signal by arithmetic processing for determining either a difference between at least two of a plurality of first detection signals generated by the first detection circuits of the plurality of detectors or a difference between at least two of a plurality of second detection signals generated by the second detection circuits of the plurality of detectors. In such a case, the processor 30 may generate the detection value θs by using the one processed signal generated.

Obviously, many modifications and variations of the present invention are possible in the light of the above teachings. Thus, it is to be understood that, within the scope of the appended claims and equivalents thereof, the invention may be practiced in other embodiments than the foregoing most preferable embodiments.

What is claimed is:

1. A position detection device comprising:
   a magnetic sensor configured to detect a target magnetic field and a noise magnetic field other than the target magnetic field, the target magnetic field being a part of an external magnetic field;
   a magnetic scale configured to generate the external magnetic field, the magnetic scale being configured so that a relative position of the magnetic scale to the magnetic sensor is changeable along a first reference direction;
   a plurality of magnets of the magnetic scale that are arranged along the first reference direction, the plurality of magnets each have a predetermined width that is a dimension in the first reference direction;
   a foremost one of the plurality of magnets in a first direction that is a direction parallel to the first reference direction that has a first end located on a front side thereof in the first direction;
   a foremost one of the plurality of magnets in a second direction opposite to the first direction that has a second end located on a front side thereof in the second direction; and
   a plurality of detectors of the magnetic sensor each configured to detect a composite magnetic field of the target magnetic field and the noise magnetic field at a position away from the magnetic scale, the plurality of detectors being each arranged to satisfy:

$AG=N(M-W)/(n-1)$, where n is a number of the plurality of magnets, M is a distance from the first end to the second end, W is the width of each of the plurality of magnets and is greater than 0 and less than or equal to M/n, AG is a gap between each of the plurality of magnets and each of the plurality of detectors in a second reference direction orthogonal to the first reference direction, and N is a number greater than or equal to 0.4 and less than or equal to 2.

2. The position detection device according to claim 1, wherein N is a number greater than or equal to 0.5 and less than or equal to 2.

3. The position detection device according to claim 1, wherein the magnetic scale further includes a yoke that is made of a magnetic material and magnetically connects the plurality of magnets.

4. The position detection device according to claim 1, wherein the plurality of detectors are arranged in a row along the first reference direction.

5. The position detection device according to claim 1, wherein the plurality of detectors each include either or both of at least one first magnetic detection element configured to detect a component of the composite magnetic field in a third direction and at least one second magnetic detection element configured to detect a component of the composite magnetic field in a fourth direction different from the third direction.

6. The position detection device according to claim 5, wherein:
   the plurality of detectors each include either or both of a first detection circuit that includes the at least one first magnetic detection element and is configured to generate a first detection signal indicating a strength of the component of the composite magnetic field in the third direction and a second detection circuit that includes the at least one second magnetic detection element and is configured to generate a second detection signal indicating a strength of the component of the composite magnetic field in the fourth direction;
   the magnetic sensor further includes a processor; and
   the processor is configured to generate one or two processed signals by arithmetic processing for determining either or both of a difference between at least two of a plurality of first detection signals generated by the first detection circuits of the plurality of detectors and a difference between at least two of a plurality of second detection signals generated by the second detection circuits of the plurality of detectors, and is configured to generate a detection value having a correspondence with the relative position by using the one or two processed signals.

7. The position detection device according to claim 5, wherein:
   the plurality of detectors each include the at least one first magnetic detection element, the at least one second magnetic detection element, a first detection circuit that includes the at least one first magnetic detection element and is configured to generate a first detection signal indicating a strength of the component of the composite magnetic field in the third direction, and a second detection circuit that includes the at least one second magnetic detection element and is configured to generate a second detection signal indicating a strength of the component of the composite magnetic field in the fourth direction;
   the magnetic sensor further includes a processor; and
   the processor is configured to:
   generate a first processed signal by arithmetic processing including determination of a difference between at least two of a plurality of first detection signals generated by the first detection circuits of the plurality of detectors,
   generate a second processed signal by arithmetic processing including determination of a difference between at least two of a plurality of second detection signals generated by the second detection circuits of the plurality of detectors, and
   generate a detection value having a correspondence with the relative position by using the first processed signal and the second processed signal.

8. The position detection device according to claim 5, wherein:
   the at least one first magnetic detection element is at least one first magnetoresistive element; and
   the at least one second magnetic detection element is at least one second magnetoresistive element.

9. The position detection device according to claim 5, wherein:
the at least one first magnetic detection element is at least one first Hall element; and
the at least one second magnetic detection element is at least one second Hall element.

10. A position detection device comprising:
a magnetic sensor configured to detect a target magnetic field and a noise magnetic field other than the target magnetic field, the target magnetic field being a part of an external magnetic field;
a magnetic scale configured to generate the external magnetic field, the magnetic scale being configured so that a relative position of the magnetic scale to the magnetic sensor is changeable along a first reference direction:
a magnet of the magnetic scale, the magnet being magnetized in a direction parallel to a second reference direction orthogonal to the first reference direction, the magnet having a first end and a second end located on opposite sides in the first reference direction; and
a plurality of detectors of the magnetic sensor each configured to detect a composite magnetic field of the target magnetic field and the noise magnetic field at a position away from the magnetic scale, the plurality of detectors being each arranged to satisfy:

$0.175M \leq AG \leq 2M$, where M is a distance from the first end to the second end, and AG is a gap between the magnet and each of the plurality of detectors in the second reference direction.

11. The position detection device according to claim 10, wherein the plurality of detectors are arranged in a row along the first reference direction.

12. The position detection device according to claim 10, wherein the plurality of detectors each include either or both of at least one first magnetic detection element configured to detect a component of the composite magnetic field in a third direction and at least one second magnetic detection element configured to detect a component of the composite magnetic field in a fourth direction different from the third direction.

13. The position detection device according to claim 12, wherein:
the plurality of detectors each include either or both of a first detection circuit that includes the at least one first magnetic detection element and is configured to generate a first detection signal indicating a strength of the component of the composite magnetic field in the third direction and a second detection circuit that includes the at least one second magnetic detection element and is configured to generate a second detection signal indicating a strength of the component of the composite magnetic field in the fourth direction;
the magnetic sensor further includes a processor; and
the processor is configured to generate one or two processed signals by arithmetic processing for determining either or both of a difference between at least two of a plurality of first detection signals generated by the first detection circuits of the plurality of detectors and a difference between at least two of a plurality of second detection signals generated by the second detection circuits of the plurality of detectors, and generate a detection value having a correspondence with the relative position by using the one or two processed signals.

14. The position detection device according to claim 12, wherein:
the plurality of detection circuits each include the at least one first magnetic detection element, the at least one second magnetic detection element, a first detection circuit that includes the at least one first magnetic detection element and is configured to generate a first detection signal indicating a strength of the component of the composite magnetic field in the third direction, and a second detection circuit that includes the at least one second magnetic detection element and is configured to generate a second detection signal indicating a strength of the component of the composite magnetic field in the fourth direction;
the magnetic sensor further includes a processor; and
the processor is configured to:
generate a first processed signal by arithmetic processing including determination of a difference between at least two of a plurality of first detection signals generated by the first detection circuits of the plurality of detectors,
generate a second processed signal by arithmetic processing including determination of a difference between at least two of a plurality of second detection signals generated by the second detection circuits of the plurality of detectors, and
generate a detection value having a correspondence with the relative position by using the first processed signal and the second processed signal.

15. The position detection device according to claim 12, wherein:
the at least one first magnetic detection element is at least one first magnetoresistive element; and
the at least one second magnetic detection element is at least one second magnetoresistive element.

16. The position detection device according to claim 12, wherein:
the at least one first magnetic detection element is at least one first Hall element; and
the at least one second magnetic detection element is at least one second Hall element.

17. A position detection device comprising:
a magnetic sensor configured to detect a target magnetic field and a noise magnetic field other than the target magnetic field, the target magnetic field being a part of an external magnetic field;
a magnetic scale that generates the external magnetic field, the magnetic scale being configured so that a relative position of the magnetic scale to the magnetic sensor is changeable along a first reference direction;
a magnet of the magnetic scale, the magnet being magnetized in a direction parallel to the first reference direction, the magnet having a first end and a second end located on opposite sides in the first reference direction;
a plurality of detectors of the magnetic sensor each configured to detect a composite magnetic field of the target magnetic field and the noise magnetic field at a position away from the magnetic scale, the plurality of detectors being each arranged to satisfy:

$0.425M \leq AG \leq 2M$, where M is a distance from the first end to the second end, and AG is a gap between the magnet and each of the plurality of detectors in a second reference direction orthogonal to the first reference direction,
wherein the plurality of detectors each include at least one first magnetic detection element that detects a component of the composite magnetic field in a third direction and at least one second magnetic detection element that detects a component of the composite magnetic field in a fourth direction different from the third direction.

18. The position detection device according to claim 17, wherein the plurality of detectors are arranged in a row along the first reference direction.

19. The position detection device according to claim 17, wherein:

the plurality of detectors each include a first detection circuit that includes the at least one first magnetic detection element and is configured to generate a first detection signal indicating a strength of the component of the composite magnetic field in the third direction, and a second detection circuit that includes the at least one second magnetic detection element and is configured to generate a second detection signal indicating a strength of the component of the composite magnetic field in the fourth direction;

the magnetic sensor further includes a processor; and the processor is configured to:

generate a first processed signal by arithmetic processing including determination of a difference between at least two of a plurality of first detection signals generated by the first detection circuits of the plurality of detectors, generate a second processed signal by arithmetic processing including determination of a difference between at least two of a plurality of second detection signals generated by the second detection circuits of the plurality of detectors, and generate a detection value having a correspondence with the relative position by using the first processed signal and the second processed signal.

20. The position detection device according to claim 17, wherein:

the at least one first magnetic detection element is at least one first magnetoresistive element; and the at least one second magnetic detection element is at least one second magnetoresistive element.

21. The position detection device according to claim 17, wherein:

the at least one first magnetic detection element is at least one first Hall element; and the at least one second magnetic detection element is at least one second Hall element.

* * * * *